US009985497B2

(12) United States Patent
Whiteley et al.

(10) Patent No.: US 9,985,497 B2
(45) Date of Patent: May 29, 2018

(54) ELECTRICAL LINEAR ACTUATOR

(71) Applicant: ELUMOTION LIMITED, Bath and North East Somerset (GB)

(72) Inventors: Graham Whiteley, Bath (GB); Craig Fletcher, Bath (GB)

(73) Assignee: ELUMOTION LIMITED, Bath and North East Somerset (GB)

( * ) Notice: Subject to any disclaimer, the term of this patent is extended or adjusted under 35 U.S.C. 154(b) by 291 days.

(21) Appl. No.: 14/778,473

(22) PCT Filed: Mar. 19, 2014

(86) PCT No.: PCT/EP2014/055556
§ 371 (c)(1),
(2) Date: Sep. 18, 2015

(87) PCT Pub. No.: WO2014/147155
PCT Pub. Date: Sep. 25, 2014

(65) Prior Publication Data
US 2016/0294252 A1    Oct. 6, 2016

(30) Foreign Application Priority Data

Mar. 19, 2013    (GB) .................................. 1305014.1

(51) Int. Cl.
*H02K 41/02* (2006.01)
*H02K 41/00* (2006.01)
(Continued)

(52) U.S. Cl.
CPC .............. *H02K 7/06* (2013.01); *H02K 1/278* (2013.01); *H02K 1/2726* (2013.01); *H02K 41/031* (2013.01)

(58) Field of Classification Search
CPC .................................. H02K 7/06; H02K 41/03
(Continued)

(56) References Cited

U.S. PATENT DOCUMENTS 3,483,412 A    12/1969  Bakker et al.
3,716,731 A     2/1973  Nilsson
(Continued)

FOREIGN PATENT DOCUMENTS

DE        3931430 A1    4/1991
JP       61173659 A    1/1985
(Continued)

OTHER PUBLICATIONS

International Search Report mailed for International Application No. PCT/EP2014/055556, filed Mar. 19, 2014, 6 pages.
(Continued)

*Primary Examiner* — Jose Gonzalez Quinones
(74) *Attorney, Agent, or Firm* — Knobbe Martens Olson & Bear, LLP

(57) ABSTRACT

An actuator that transforming electrical energy into mechanical energy (or vice-versa) that is particularly suited to portable applications requiring a high degree of efficient control, e.g. applications in which human-like movement needs to be simulated or interacted with. The actuator has a stator comprising electromagnetic sectors for generating phased electromagnetic fields around the stator and at least one cylindrical element (and preferably two such elements). The stator and the cylindrical element(s) are arranged concentrically around a central axis. The cylindrical element has permanent magnetic elements magnetized radially and arranged as one or more discontinuous helices. Phased magnetization of the stator causes the cylindrical element to rotate around the axis along a helical path, thereby exerting a longitudinal force along the axis. Preferably one cylindrical element rotates along a helical path relative to another cylindrical element that has permanent magnetic elements magnetized radially and arranged in one or more helices.

(Continued)

Applications of the actuator include prosthetic limbs and orthoses, and for service and remotely operated robots.

16 Claims, 16 Drawing Sheets

(51) Int. Cl.
    *H02K 37/00*          (2006.01)
    *H02K 21/24*          (2006.01)
    *H02K 7/06*            (2006.01)
    *H02K 1/27*            (2006.01)
    *H02K 41/03*          (2006.01)

(58) Field of Classification Search
    USPC ........... 310/13, 49.38, 49.39, 156.34, 156.37
    See application file for complete search history.

(56) References Cited

U.S. PATENT DOCUMENTS

| | | |
|---|---|---|
| 4,004,299 A | 1/1977 | Runge |
| 4,560,894 A | 12/1985 | Stoll |
| 4,754,181 A | 6/1988 | Mizobuchi |
| 5,079,458 A | 1/1992 | Schuster |
| 5,300,111 A | 4/1994 | Panton et al. |
| 2004/0041474 A1 | 3/2004 | Lunz et al. |
| 2009/0251013 A1* | 10/2009 | Vollmer ................ H02K 16/00 310/12.14 |

FOREIGN PATENT DOCUMENTS

| | | | |
|---|---|---|---|
| JP | 61173659 A * | 8/1986 | ............... H02K 7/06 |
| JP | 10257751 A | 3/1997 | |
| WO | WO97/41633 A1 | 11/1997 | |

OTHER PUBLICATIONS

IPO Search Report mailed for GB application No. GB1305014.1, filed Mar. 19, 2013, 62 pages.

Jiabin Wang et al: "Analysis of a Magnetic Screw for High Force Density Linear Electromagnetic Actuators", IEEE Transactions on Magnetics, vol. 47, No. 10, Oct. 1, 2000 pp. 4477-4480.

Siavash Pakdelian et al. "An electric maching integrated with trans-rotary magnetic gear", 2012 IEEE Energy Conversion Congress and Exposisiotn (ECCE), Sep. 1, 2012, pp. 3356-3362.

* cited by examiner

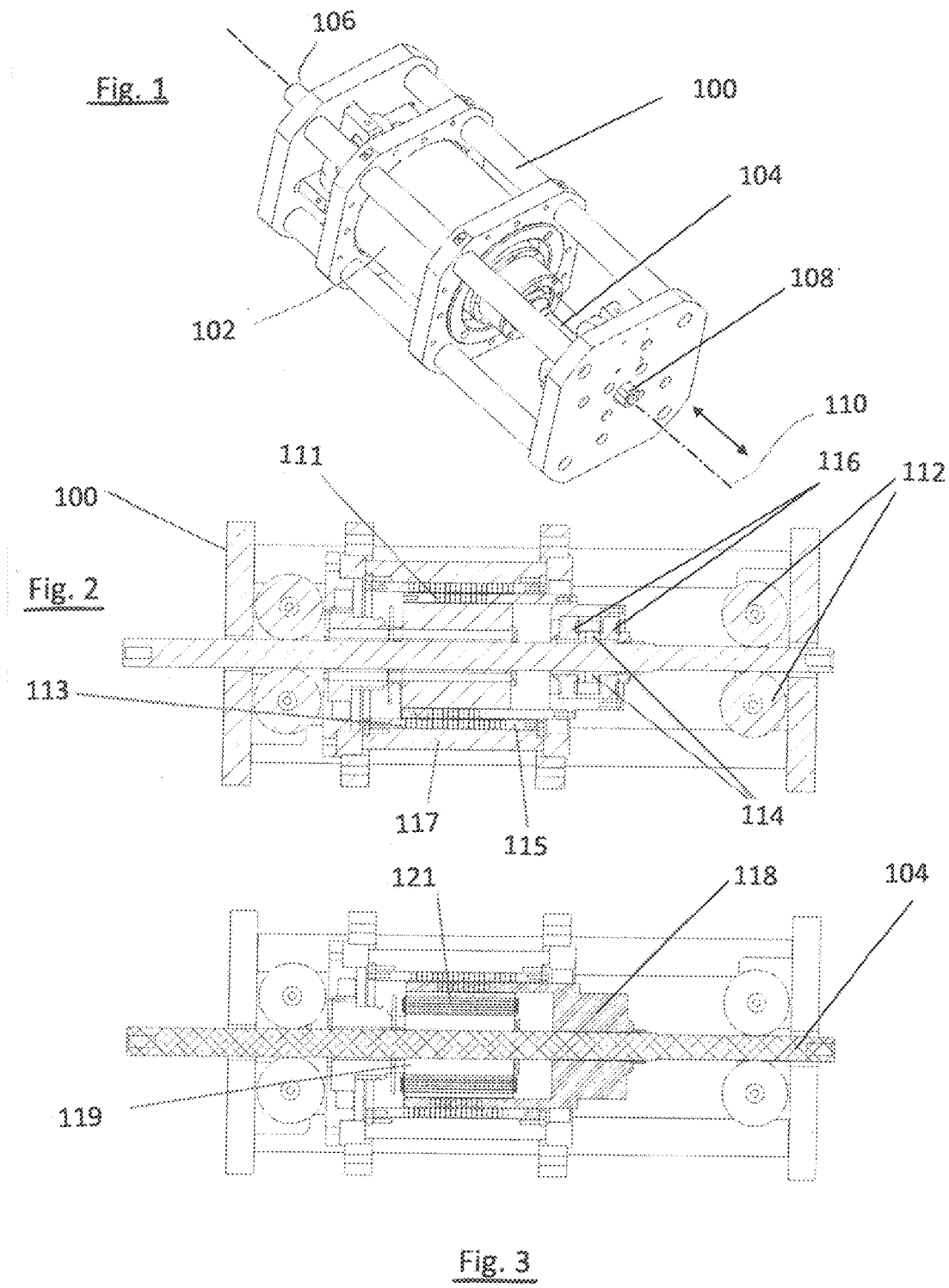

126 128

136
138

130

132 134

140

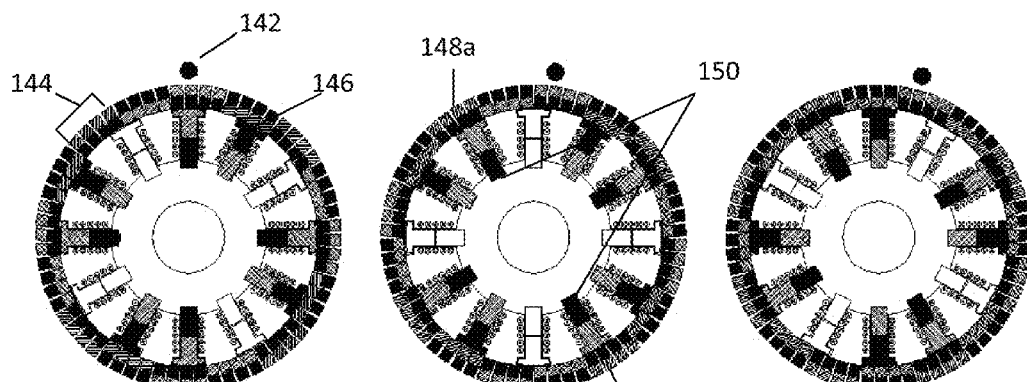
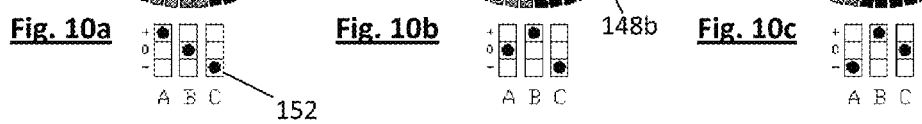
Fig. 10a Fig. 10b Fig. 10c
Fig. 10d Fig. 10e Fig. 10f
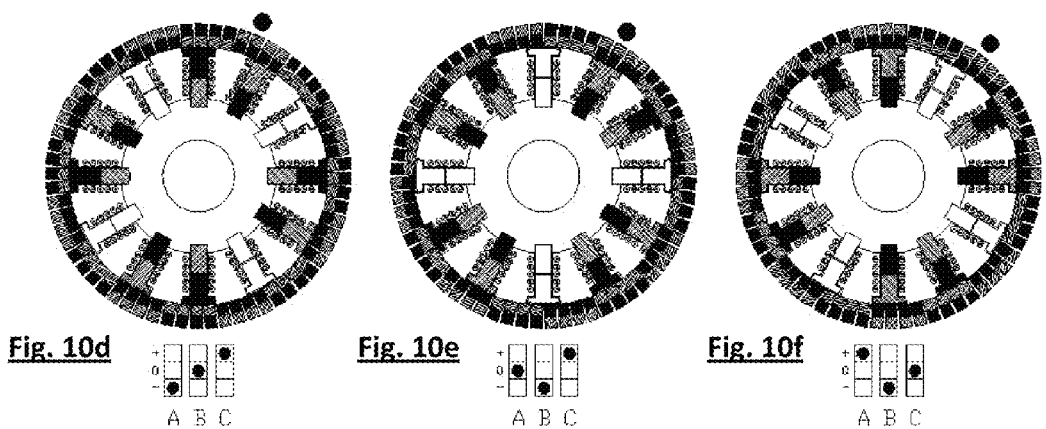
Fig. 11a  Fig. 11b

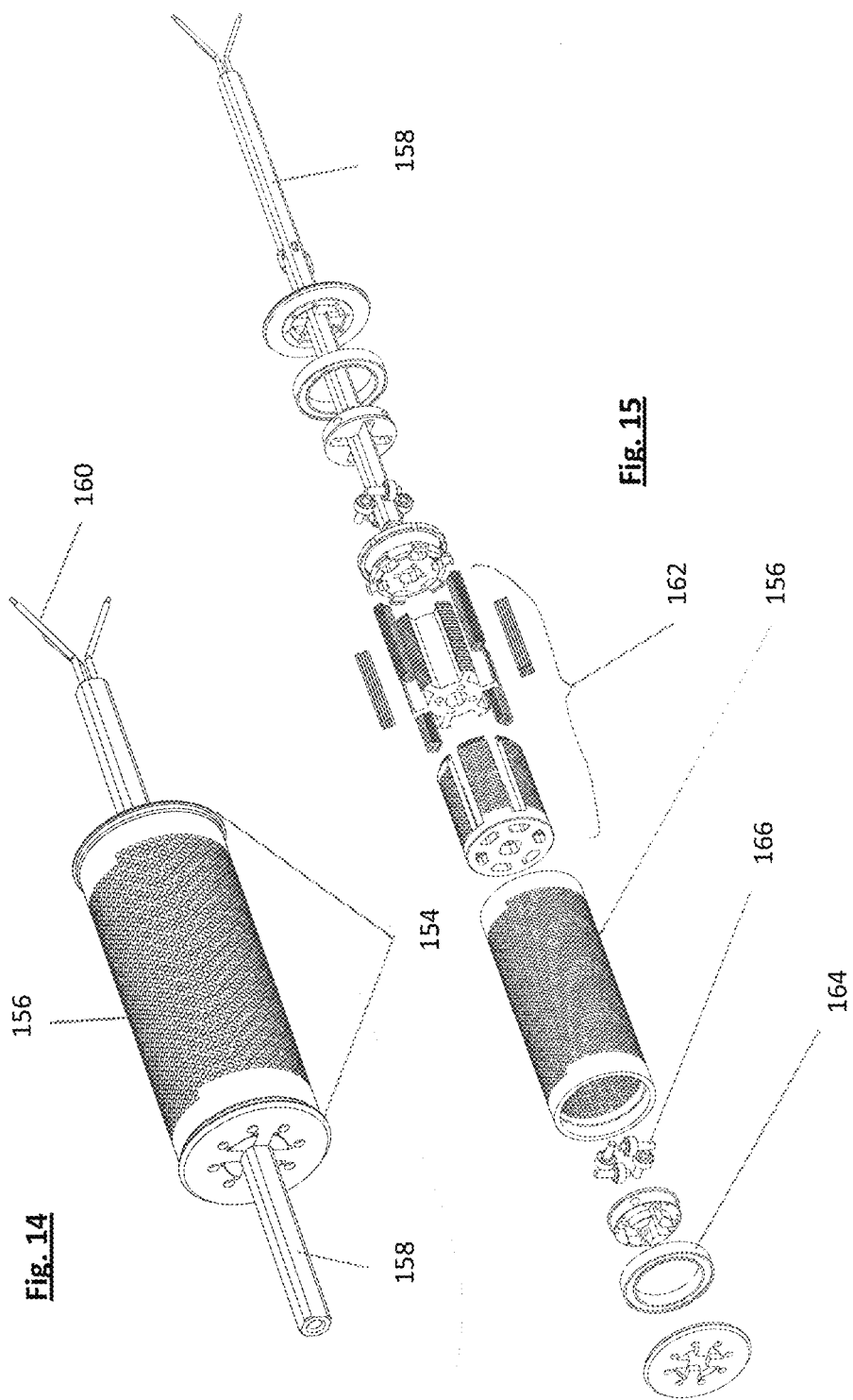

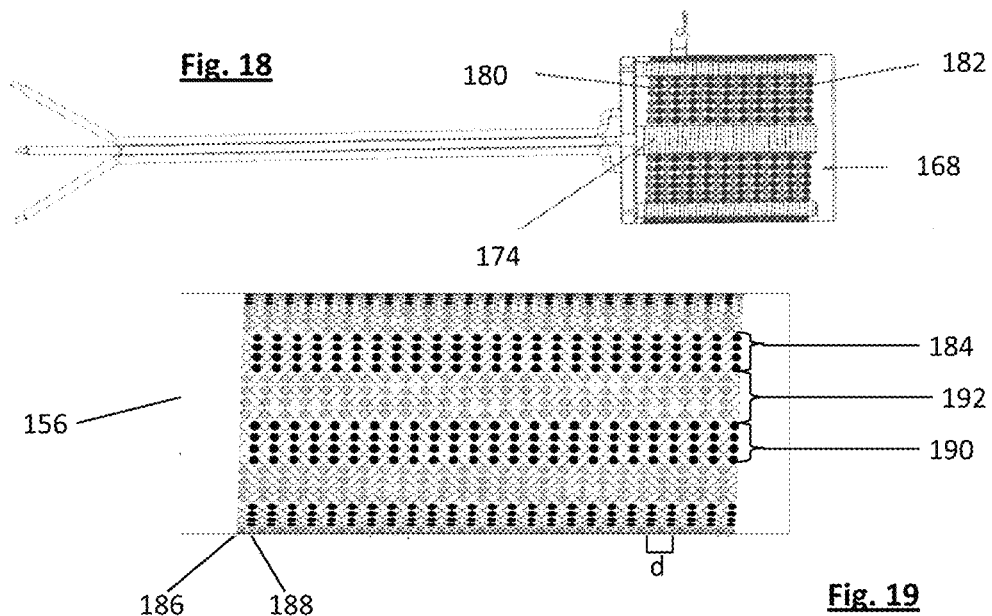
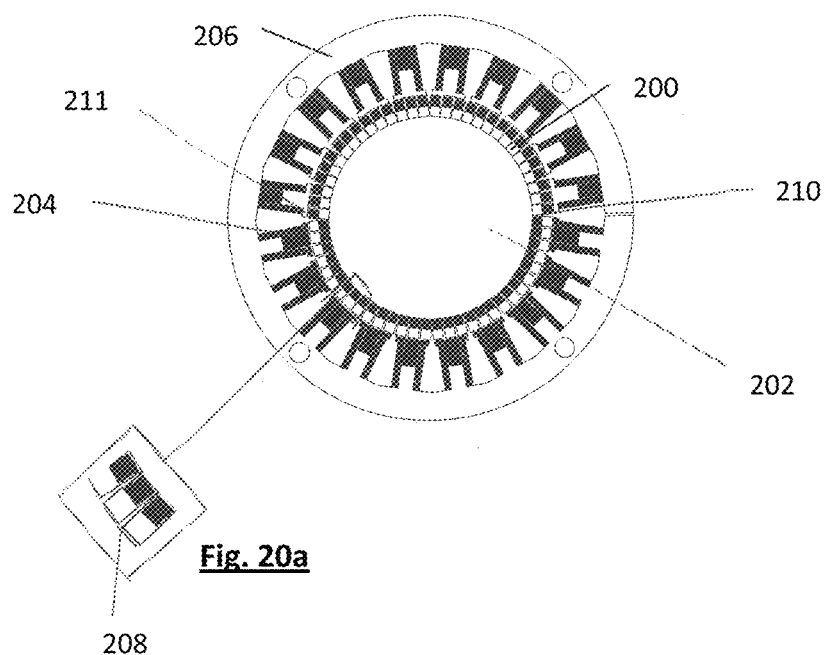

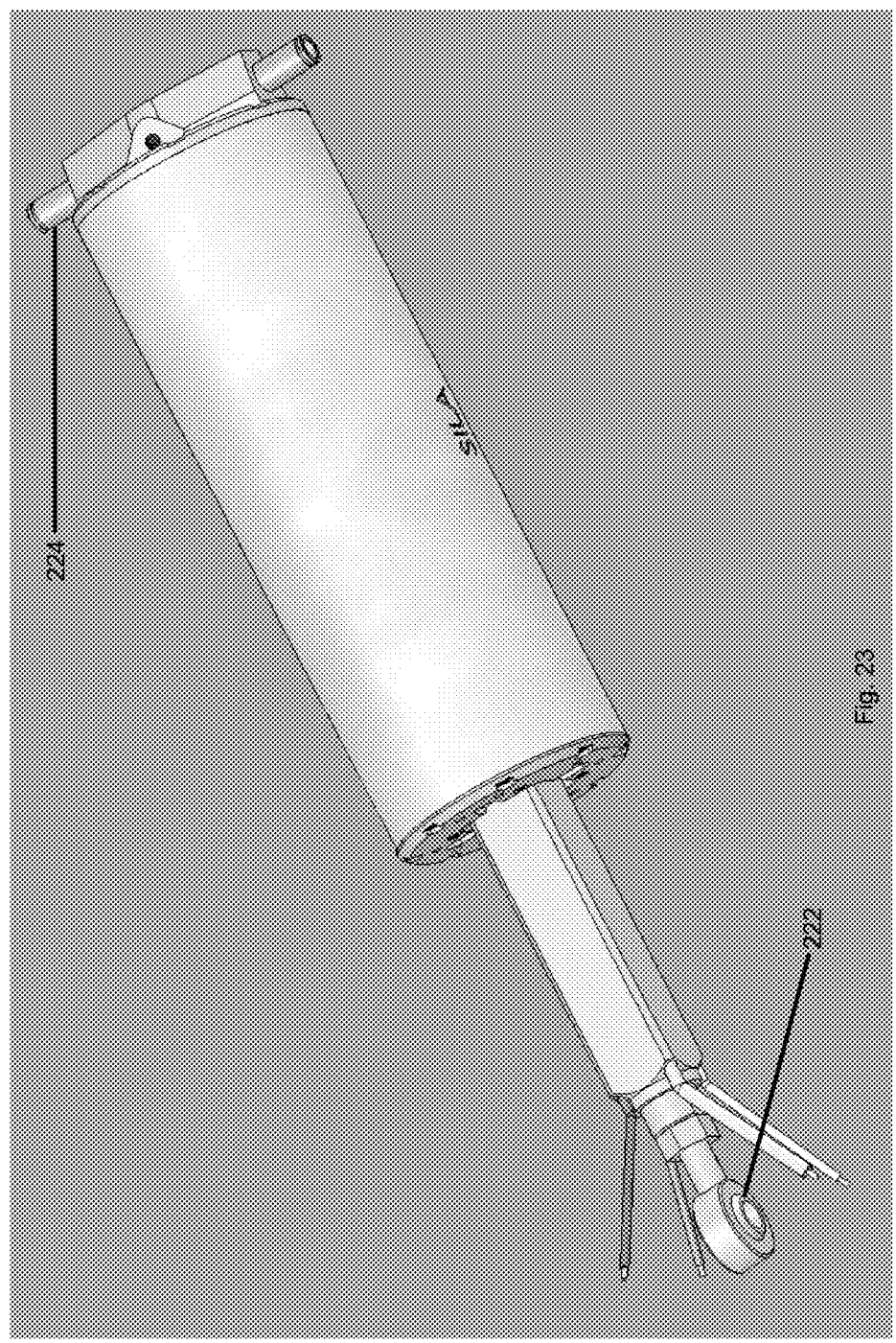

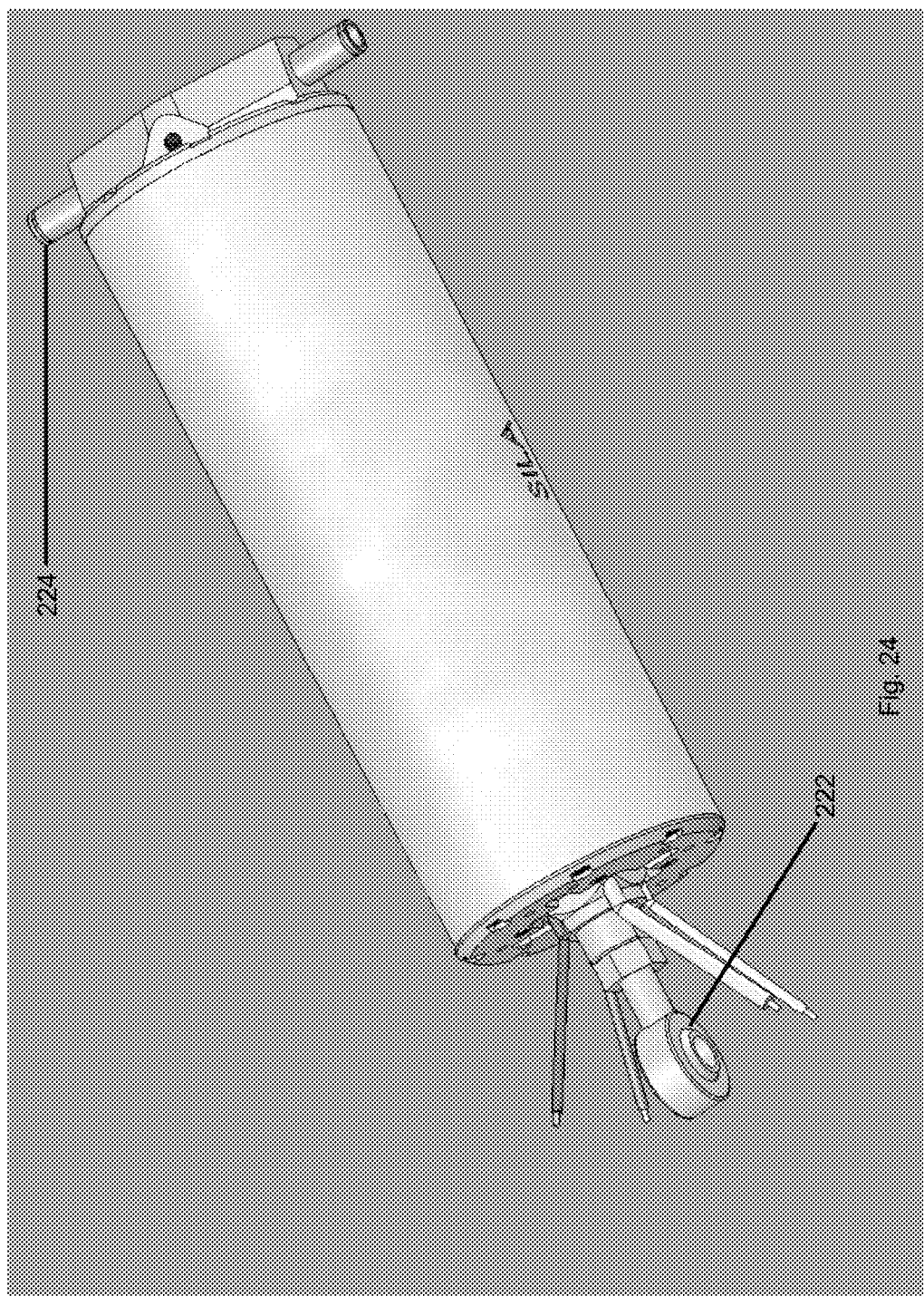

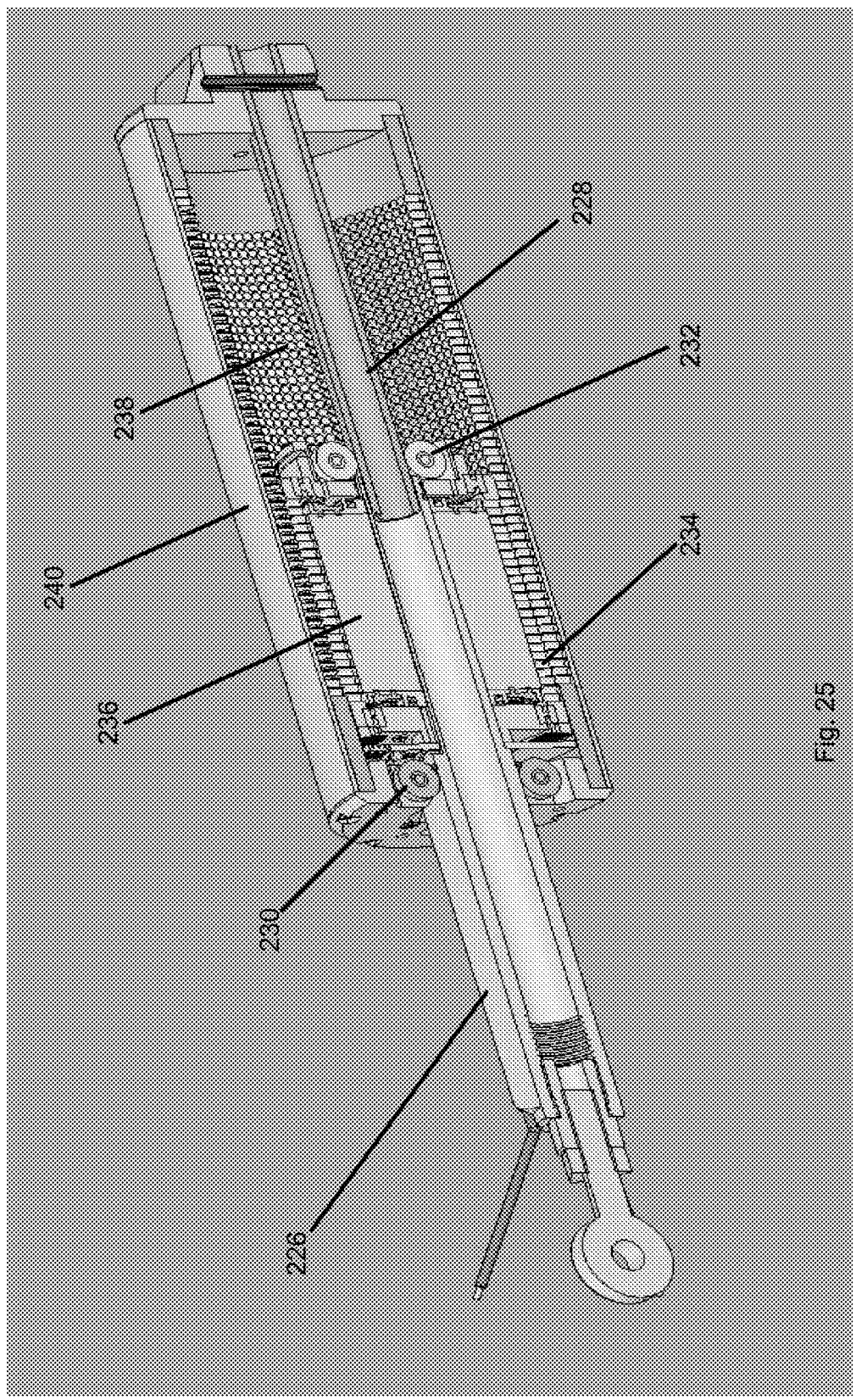

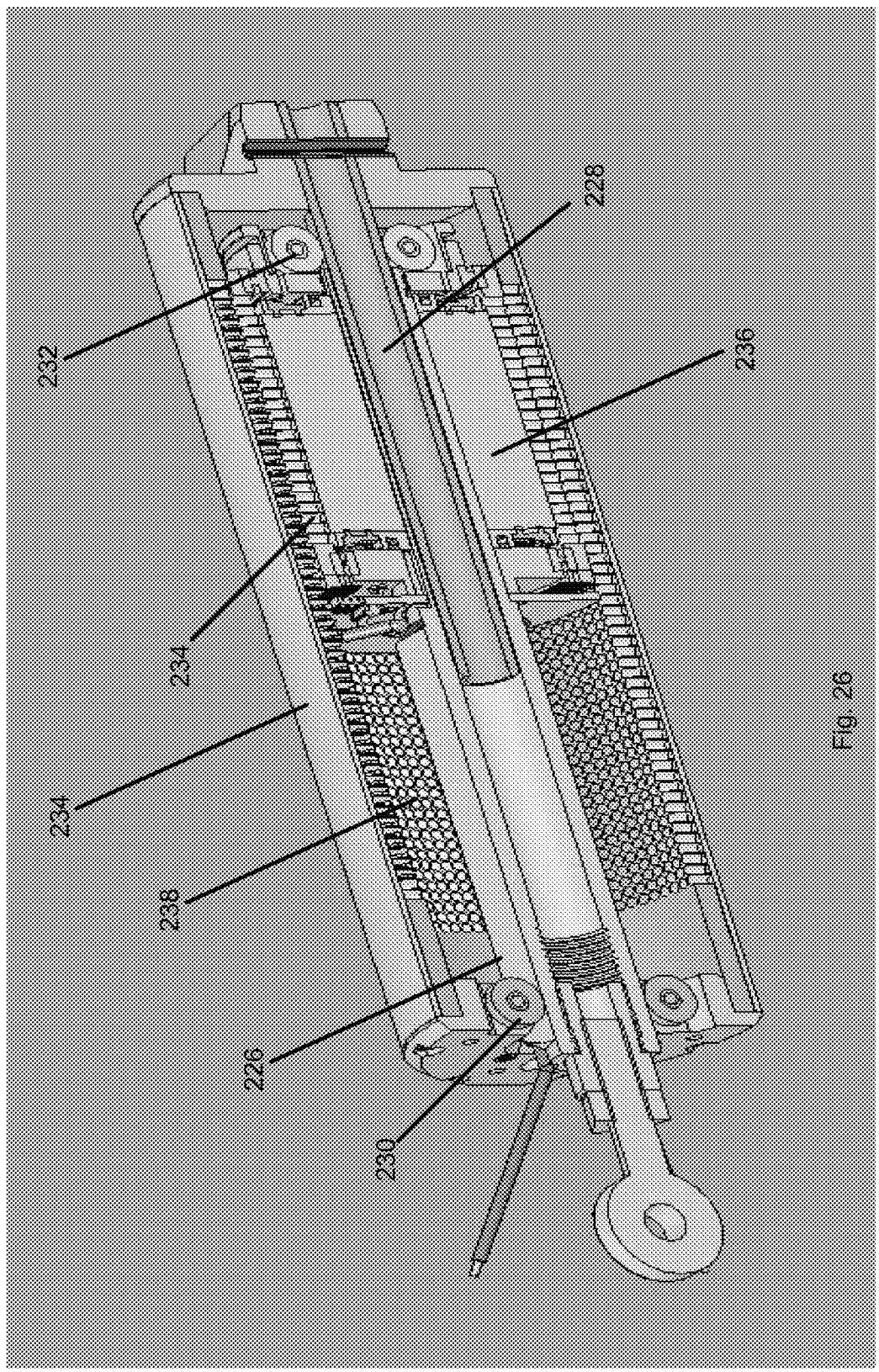

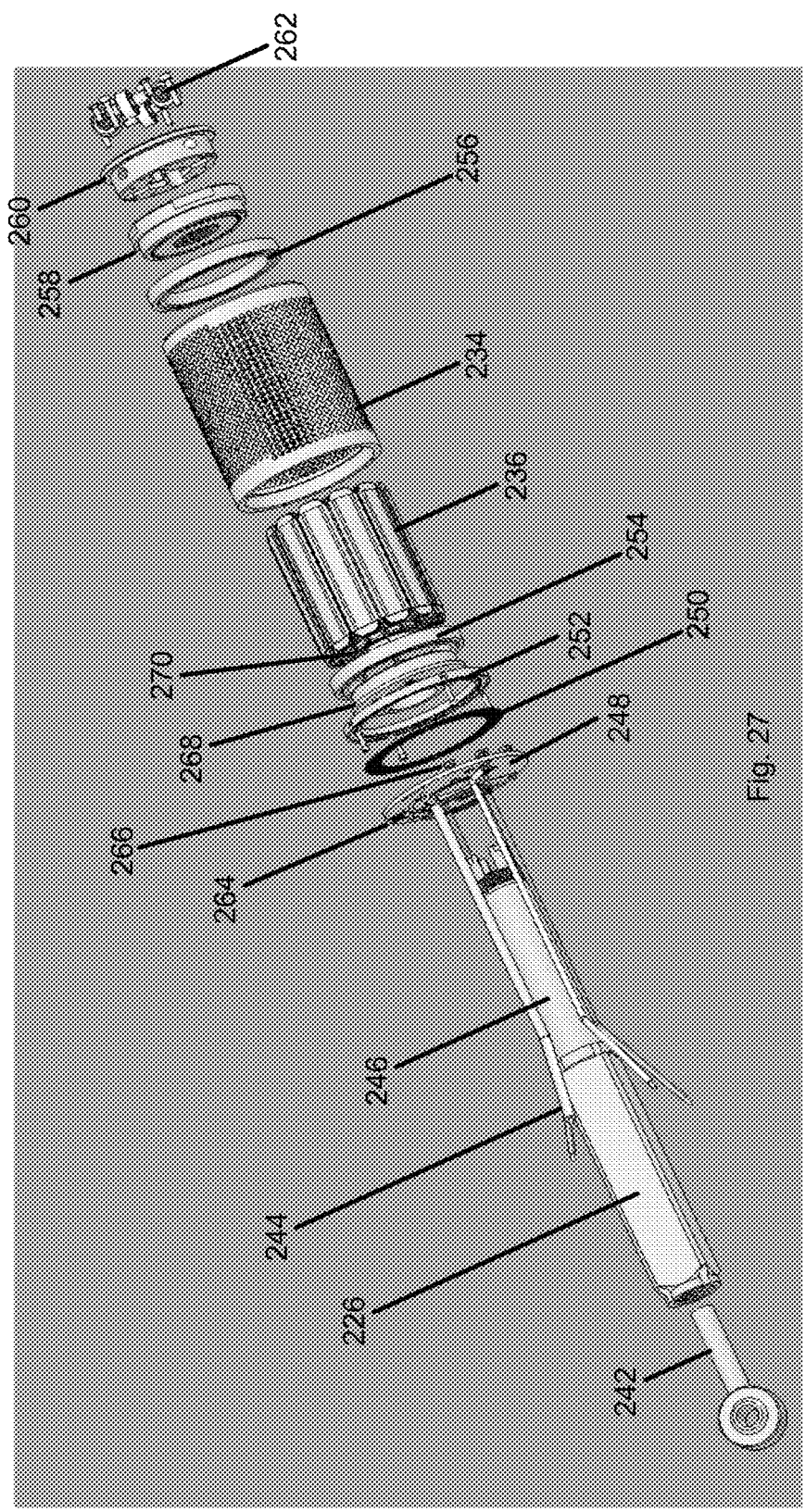

ELECTRICAL LINEAR ACTUATOR

CROSS-REFERENCE TO RELATED APPLICATIONS

This application is the U.S. National Phase under 35 U.S.C. § 371 of International Application PCT/EP2014/055556, filed Mar. 19, 2014, which claims priority to GB Patent Application No. 1305014.1, filed Mar. 19, 2013. The disclosures of the above-described applications are hereby incorporated by reference in their entirety and are hereby expressly made a portion of this application.

FIELD OF THE INVENTION

This invention relates to an actuator, i.e. a means of transforming electrical energy into mechanical energy, producing relatively low linear speed, high thrust movements from relatively swiftly changing electromagnetic fields. The invention is particularly suited to portable applications requiring a high degree of efficient control, e.g. applications in which human-like movement needs to be simulated or interacted with. Such applications include actuators for prosthetic limbs and orthoses, and for service and remotely operated robots.

BACKGROUND TO THE INVENTION

Electrical linear actuators typically take the form of linear stepping motors and rotary stepping and brushless motors mechanically connected to lead-screw, ball-screw, planetary roller-screw and 'Rohlix' transmissions.

U.S. Pat. No. 4,234,831 'Compound rotary and/or linear motor' relates to a compound rotary and/or linear motor. It has two interposed magnet systems of which at least one is variable by an electronic control system to generate rotary and/or linear motion of the other. One of the two magnet systems consists of axially consecutive arrangements, preferably rings, of electrically separate magnet poles. The other magnet system contains at least one pair of magnet poles. The electronic control system is designed optionally or according to program to generate rotary motion by sequentially energizing consecutive magnets in a ring, to generate linear motion by sequentially energizing axially consecutive magnets and to generate a combined linear and/or rotary motion by sequentially energizing consecutive magnets forming a helix.

Low torque actuators for heart valves that use helical arrays of alternating magnets are known from WO97/41633 A1 (EP0903003) 'Rotary torque-to-axial force energy conversion apparatus' that describes a highly specialised ventricle assist device for a heart. describes a rotary to linear actuator primary designed for use as a Total Artificial Heart (TAH) prosthesis.

JP61173659 A discusses an alternately polarised permanent magnetic helix. Alternating axial magnetic pole stripes extend the length of the rotor and match with machined stator grooves/notches. This approach theorises that the grooves in the rotor and gaps between the stator laminates could be used to increase flux reluctance and guide the rotor in a helical path. The "reluctance" approach is neither forceful nor efficient as an energy transduction and transmission method.

US2004/041474 describes a rotor that is moved helically due to the electromagnetic influence of a stator. Within this design the rotor and stator interdigitate. The permanent magnets attached to the rotor shaft are face magnetised parallel to the long axis of the rotor shaft.

JP10257751 describes a rotor with a multistart alternating magnetic thread propelled by a electromagnetic multipole stator with helical stator teeth. It describes a twin start magnet nut and bolt used as a means of converting rotary to linear movement.

There is a need for a linear actuator that has certain advantageous characteristics. For certain applications, an actuator should be compact, lightweight, powerful and efficient. Ideally it should also be highly integrated and provide a highly controllable transformation of electrical to mechanical energy. This technical agenda is driven by the attempt to make a practical and competitively performing actuator that can be portable, and may be used in prosthetics, robotics and automation.

SUMMARY OF THE INVENTION

According to the invention, an actuator is provided, comprising: a stator having electromagnetic sectors for generating phased electromagnetic fields around the stator; and at least one cylindrical element. The stator and the cylindrical element are arranged concentrically around a central axis. The cylindrical element comprises permanent magnetic elements magnetized radially and arranged as one or more discontinuous helices. Phased magnetization of the stator causes the cylindrical element to rotate around the axis along a helical path, thereby exerting a longitudinal force along the axis.

Preferably, there are first and second cylindrical elements, the stator and the first and second cylindrical elements being arranged concentrically around a central axis. The first cylindrical element comprises permanent magnetic elements magnetized radially and arranged in at least one helix, and the second cylindrical elements comprises permanent magnetic elements magnetized radially and arranged as one or more discontinuous helices. Phased magnetization of the stator may cause the second cylindrical element to rotate around the axis along a helical path relative to the first cylindrical element, thereby causing one of the first and second cylindrical elements to exert a longitudinal force along the axis.

Efficient transformation of energy is achieved by using changing electromagnetic fields of a stator section to propel a rotor through a helical path. Integrating the use of magnetic and electromagnetic fields in both the primary torque generating components and also the transmission components, means that friction is absent. By using a rotor that follows a helical path, rather than a linear path, the work done by the rotor is better matched, by the mechanical advantage of the pitch of the helix and the diameter of the rotor, to the forces and torques required, e.g. as exerted by human limbs of a comparable scale. The absence of conventional mechanical gears and screws, and the associated friction generated by these components, makes for an efficient actuator that is also very quiet in use, making it highly appropriate for prosthetic devices in which undue operational noise can draw unwanted attention to the wearer.

The second cylindrical element is preferably mounted around the stator, with the first cylindrical element mounted around the second cylindrical element. Alternatively, the stator is mounted around the second cylindrical element and the second cylindrical element is mounted around the first cylindrical element. The second cylindrical element is preferably free to rotate relative to an axis, but axial movement between the second cylindrical element and the axis is constrained, whereby the axle moves longitudinally relative to the frame and exerts a longitudinal force relative to the frame.

The first cylindrical element may comprise permanent magnetic elements magnetized radially and arranged in first and second interwound helices, the magnetic elements of the first helix being of opposite polarity to the magnetic elements of the second helix.

The or each discontinuous helix of the second cylindrical element may comprise no more than a pair of diametrically opposed magnetic lugs. Preferably the second cylindrical element comprises sectors of relatively high and low magnetization, alternating along a helical path around the cylindrical element. It preferably has sectors of relatively high and low magnetization, alternating in an axial direction along the cylindrical element. It may have a first helix of alternating sectors of relatively high and low magnetization and a second helix, interwound with the first helix, of alternating sectors of relatively high and low magnetization, the sectors of relatively high magnetization of the first helix and the sectors of relatively high magnetization of the second helix being of opposite polarity and being at an angular offset to each other.

Preferably the stator has N sectors and the second cylindrical element comprising permanent magnetic elements arranged has at least one helix with at least N+1 sectors. More preferably the second cylindrical element comprising permanent magnetic elements arranged has at least one helix with at least 4N/3 sectors.

In a preferred embodiment, the second cylindrical element has an open end and a closed end, the open end mounted over the stator with the stator free to move in and out of the open end, and the closed end having a bearing by which it is mounted on the axle.

A method of manufacture of an actuator is also provided, comprising: forming a stator comprising electromagnetic sectors for generating phased electromagnetic fields around the stator; and forming a cylindrical element having permanent magnetic elements magnetized radially and arranged as one or more discontinuous helices, and mounting the stator and the cylindrical element concentrically around a central axis, rotatable around the axis along a helical path relative to the first cylindrical element.

A method for producing longitudinal force is provided. Phased electromagnetic fields are generated around a stator with electromagnetic sectors. At least one cylindrical element is arranged concentrically with the stator around a central axis, the cylindrical element comprising permanent magnetic elements magnetized radially and arranged as one or more discontinuous helices. The sectors of the stator are magnetized in angular phases to cause the cylindrical element to rotate around the axis along a helical path, thereby causing the cylindrical element to exert a longitudinal force along the axis.

The absence of mechanical interconnection between the relatively moving rotor and stator means that when the stator is un-powered, there are no electromagnetic fields to constrain the rotor and it can move freely along the helical path as long as radial magnetic cogging torque between the stator and rotor are designed to be minimal or non-existent. This feature is useful if the actuator is used to propel the knee joint of a prosthetic lower-limb, as it enables the knee to be extended using the momentum generated by the movement of the persons intact body sections (thigh, glutteal and core muscles), permitting the person to walk naturally with the device for long periods without using portable electrical battery supplies. This feature is also useful in service robotics as it presents a failsafe feature for active joints that come into close proximity to people, permitting the robot's joints to be entirely limp and back-drivable once electrical power is removed from the robot. In contrast, if the off-power magnetic cogging torque between the rotor and stator are designed to produce a certain torque value then this will be amplified by the mechanical advantage of the magnetic helical screw. Applications benefitting from this latter approach include positioning devices that need to stay cranked against gravity for long durations, where it is preferable that electrical energy should not be expended to remain stationary in this position, as expending energy might cause undue power supply dissipation, electrical noise, heat build-up.

The stator is preferably made from a stack of a number of relatively thin ferromagnetic electrical steel laminates stacked and bonded together and electrically insulated from one another. Using this method produces a stator 'core' that can provide a good path for magnetic flux and relatively poor electrically conductive path, in this way reducing unwanted eddy currents and so promoting efficiency. In such cases, cogging torque is tailored by (i) increasing the circular air gap between the stator and rotor (but this approach significantly reduces wanted on-power torque) (ii) reducing the differential reluctance to the magnetic flux as the rotor turns, i.e. making the air gap slot openings as small as possible (wide air gap=high magnetic flux reluctance) (iii) skewing (partially radially offsetting) the laminates in the build of the stack to partially (or fully) span the air gap relative to the depth of the stator.

A further benefit of the absence of mechanical interconnection between rotor and stator sections is that the actuator is more durable, as contaminant ingress such as; dust, dirt and sand are not as damaging to its function, as they might be to a precisely toleranced mechanical transmission. This is particularly useful to a portable device that may be used outdoors. The absence of mechanical parts in the transmission also adds to the longevity of the actuator and the operational duration between service intervals.

The electromagnetic engagement between the rotor and stator sections means that there is a high degree of control that can be achieved in the movement and force generated by the actuator; additionally, the intrinsic electrical control of this engagement means that this can be changed very rapidly and subtly. This is particularly appropriate for an actuator that is used as a replacement prosthetic knee, as it permits the actuator to simulate the action of a highly controllable variable stiffness damper enabling the person in one instance high-stiffness stable low-speed movement, whilst in another instance low-stiffness efficient high rate mobility. This feature is also appropriate to orthoses that support intact but poorly functioning human limbs, as in the case of limbs exhibiting tremors, where through the swift control of the actuator mechanically linked in parallel to the person's own limb it might be used to damp unwanted tremors whilst supporting force and movement of their desired movement. The subtly of control is also appropriate for using the actuator for haptic devices that need to simulate the forces exerted on remote or virtual objects to the operator, such devices include fly-by-wire joysticks and haptic styluses and other tools in the control of teleoperated surgery.

The electrical control and electromagnetic engagement of the relatively moving parts means that positioning can be achieved with high repeatability and with zero backlash. This is especially appropriate to positioning systems such as computer-controlled optical devices, and computer-controlled machine tools.

The invention integrates torque generating and transmission stages into a single combined stage, aiding a minimal bulk and mass unit to be created. High power and small mass actuator units are appropriate to many portable devices and especially appropriate to actuators that need to be supported from a person's body for a sustained duration, as is the case with prosthetic limbs.

Preferred embodiments of the invention are now described, by way of example only, with reference to the accompanying drawings.

BRIEF DESCRIPTION OF THE DRAWINGS

FIG. 1 is a perspective view of a prototype actuator in accordance with an embodiment of the invention.

FIG. 2 is a cross sectional view of the actuator of FIG. 1.

FIG. 3 is a partially sectioned view of the actuator of FIG. 1.

FIGS. 10a to 10f show the preferred rotor and stator components in cross section with various states of magnetic energisation.

FIG. 11 is a diagrammatic representation of the stator component of FIG. 10 separated into three phases.

FIG. 14 is a perspective view of an alternative arrangement to that of FIG. 4.

FIG. 15 is an exploded view of the elements in FIG. 14.

FIG. 18 shows detail of the magnetic arrangement of an element of FIG. 15.

FIG. 19 shows detail of the magnetic arrangement of an element of FIG. 15.

FIG. 20 shows a further alternate embodiment.

FIGS. 23 to 26 show a further alternate embodiment.

FIG. 27 is an exploded view of the embodiment of FIGS. 23 to 26.

DETAILED DESCRIPTION OF THE DRAWINGS

Figure 4:
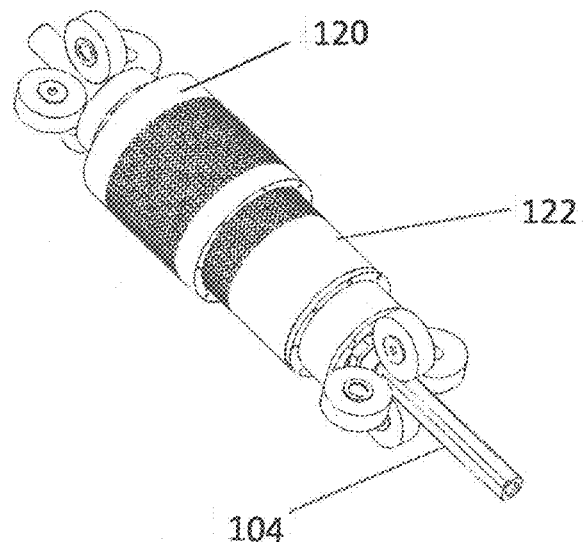
FIG. 4 is perspective view of the first and second cylindrical elements of the actuator of FIG. 1.

Referring to FIG. 1, a prototype actuator is shown in the form of a test rig having a frame 100, with an actuator 102 mounted therein, the actuator having a shaft 104. The shaft 104 has a first end 106 that will be referred to as the proximal end and the second end 108 that will be referred to as the distal end. The proximal end 106 is circular in cross section. The distal end 108 has a prismatic shape, i.e. it has flattened faces or is square in cross section (or is triangular in cross section).

In operation, the actuator 102, upon an application of electric current in manners described below, causes the shaft 104 to move longitudinally along an axis 110. Either the proximal end 106 or the distal end 108 is connected to a load to exert a force on the load relative to the frame 100. In this way, the actuator acts like a piston. It can apply a force in either direction along the axis 110. Significantly, it can also resist a force along that axis. Its ability to resist a force can, in some circumstances, be greater than its ability to move a load against an applied force.

Referring to FIGS. 2 and 3, elements of the actuator are shown in greater detail. Wheel bearings 112 are shown to interface with the distal end 108 of the shaft 104. The shaft 104 has a fixed collar 114 attached. An outer cylindrical element 115 is fixed with respect to the frame 100. The outer cylindrical element 115 is housed within a non-magnetic actuator housing 117 that is fixed to the frame. Within the cylindrical element 115 is a can-shaped (i.e. closed cylinder) component 118 that contains an annular ball-bearing race 116. The component 118 has a section that has a magnetic element 111 shown in alignment with a magnetic element 113 that is also present on outer cylindrical section 115. Inside the can-shaped component 118 is a central stator element 119 made from a ferromagnetic material, which has conductive wire windings 121. Can-shaped component 118 moves freely between stator element 119 and outer cylindrical element 115.

In operation, the bearings 112 interface with the distal end 108 of the shaft 104 to allow motion along axis 110, but prevent rotation. The ball-bearing race 116 of can-shaped component 118 interfaces with the collar 114 to allow the component 118 to rotate independently of shaft 104. When linear axial displacement of component 118 occurs, it pushes against collar 114 and causes shaft 104 to move axially. Prevention of rotation of shaft 104 provided by flats 108 and wheel bearings 112 provides the opportunity to mount subsequent fixed collars for sensors about shaft 104 detecting the relative rotation of the can-shaped component 118 with respect to the shaft 104. These sensors commonly include magnetic sensors, such as Hall Effect sensors for closed loop control of phase currents to the stator and precise rotary position encoders used in closed loop positioning control.

Referring to FIG. 4, a view of the rotor and stator elements of the actuator 102 is shown with the frame 100 removed. The outer cylindrical element 115 will be referred to as the "nut 120". The nut 120 is held fixed with respect to the frame 100, and is made from a non-ferromagnetic material that is drilled with a twin-start helical array of holes. The can-shaped component 118 is a cylindrical rotor element and will be referred to as the "bolt 122". The bolt 122 has a rotary freedom with respect the shaft 104, and is made from a non-ferromagnetic material that is drilled with a helical array of holes of a similar pitch to the nut 120. The helical pattern is preferably a twin-start helical array; having two separate continuous helical paths that each spans the surface of the bolt 122 (although other arrangements are possible, including four helices). The holes are filled with powerful magnets, preferably rare-earth magnets such as neodymium iron boron magnets, with poles orientated along radial projections in a pattern described below. Thus, the permanent magnetic elements of one or both of the first and second cylindrical elements may be formed as magnetized plugs mounted in radial holes formed in a cylinder of non-ferromagnetic material. Means may be provided to retain each magnetic plug in its hole. E.g. each plug may have an interference fit with its respective hole, or each plug and hole may be screw-treaded, or the plugs may be glued in place, or the holes may not pass completely through the bolt, to retain the plugs at their inner end or outer end, with (optionally) a thin tight-fitting sleeve to retain them at the opposite (outer or inner) end.

Figure 5:
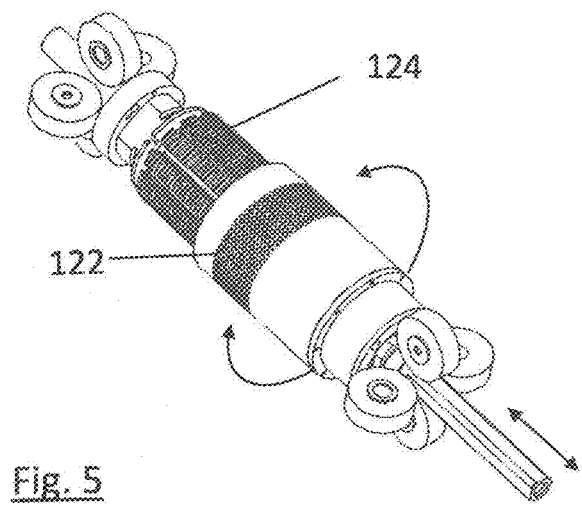
FIG. 5 shows the elements of FIG. 4, with the outer cylindrical element removed to show the stator underneath.

Referring to FIG. 5, the elements of FIG. 4 are shown with the outer cylindrical component (the nut 120) being removed to show the elements underneath. Component 124 will be referred to as the stator. The stator 124 is held fixed with respect to the frame 100, and is made from a highly ferromagnetic material for most high torque applications and greatest axial restraint, but it may be constructed from non-ferromagnetic material if zero off-power cogging torque is priority.

In operation, the bolt 122 rotates, with respect to both the fixed nut 120 and the fixed stator 124, around an axis along the line of the shaft 104. The direction of this motion is shown in FIG. 5.

Figure 6:
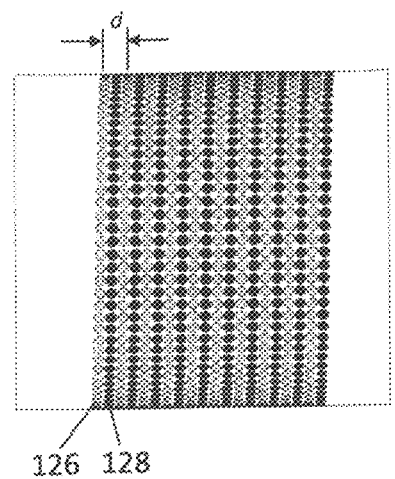
FIG. 6 shows the outer cylindrical component of FIG. 4, referred to as the "first cylindrical element" or the "nut".

Referring to FIG. 6, a detailed view of the nut 120 is shown. A helically drilled arrangement of holes as shown in FIG. 4 is assembled with magnets with a similar pole facing radially outward and other magnets with a similar pole facing radially inward. A twin-start helical array is arranged with each of two separate threads 126 and 128 containing a different magnetic pole. This creates an alternating pole arrangement between the two threads 126 and 128, with a helical pitch 'd'.

The air gap and the non-ferromagnetic material present reluctance to the flux created by the electromagnet. This reluctance reduces the flux greatly with distance (approx=$k*1/distance^3$). Over the distance of the wall thickness, of the can-shaped component 118, the flux is negligible at the external diameter of the bolt 122 and presents minimal deleterious influence against the outer helical nut 120.

Figure 7:
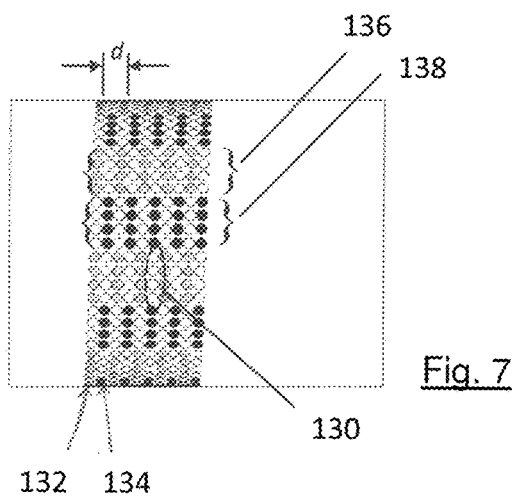
FIG. 7 shows a cylindrical component that fits inside the component of FIG. 6, referred to as the "second cylindrical element" or the "bolt".

Referring to FIG. 7, a detailed view of the bolt 122 is shown. A helically drilled twin-start arrangement of holes is provided with an arrangement of inwardly and outwardly facing magnets with helical pitch 'd'. The magnetic arrangement of bolt 122 is formed of three types of magnetization: north, south or neutral. Neutral is achieved using either absent or partial length magnets 130. The helical twin-start arrangement of magnets contains two distinct threads 132 and 134, with each thread having only two types of magnetization, a first thread comprising alternating sectors of north poles (four in this example) followed by neutral poles (e.g. four), and a second thread comprising alternating sectors of south poles (four) followed by neutral (also four). For both threads a pattern is achieved with regular absent magnets 130. Each magnetic sector can comprise more (e.g. five or six) or fewer (e.g. three or two) magnets or can be made of a single, preferably arcuate magnet or groupings of rectangular magnets. Each turn of each helix preferably has an equal even integer number of magnetized and neutral sectors (but there could be more or longer magnetized sectors than neutral sectors). The number of sectors in each turn can be greater or smaller. Preferably, magnetized sectors and neutral sectors are aligned in the axial direction and alternate (e.g. north-neutral-north-neutral on one helix and south-neutral-south-neutral on the other helix, but each helix could alternate north-neutral-south-neutral-north, and other arrangements are possible).

The pattern created forms alternating magnetic bands 136 and 138 parallel to the long axis of the bolt 122. In one revolution of either helical thread, sixteen magnetic bands are present in the preferred arrangement; eight sets of band 136 and eight sets of band 138. The regular alternating axial bands 136 and 138 create discontinuities for the stator 124 to electromagnetically work against to produce the required torque.

Figure 8:
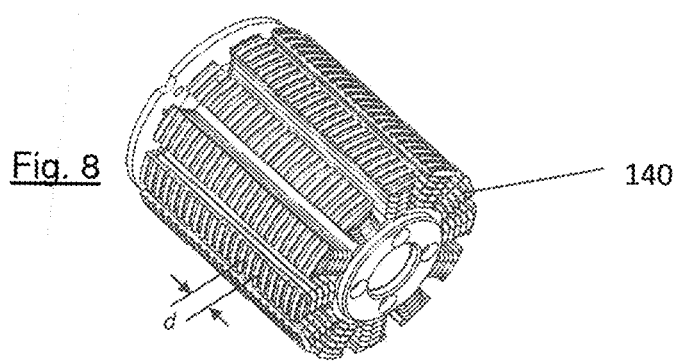
FIG. 8 shows an electromagnetic stator that fits inside the second cylinder of FIG. 7.
Figure 21:
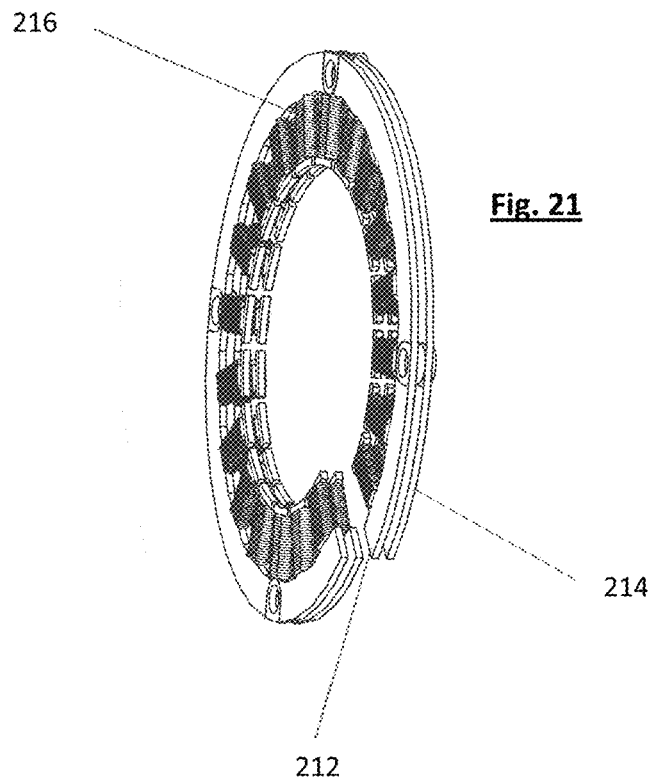
FIGS. 21 and 22 show elements of FIG. 20 in different orientations.

Referring to FIG. 8, a detailed view of the stator 124 is shown. The stator 124 has ferromagnetic radial projections, each being wound with electrically conductive laminated wire. These form a radial array of electromagnets 140. Preferably, each electromagnet pole (e.g. outward north pole) runs the entire axial length of the stator. This interacts with the permanent magnetic bands 136, 138 on the bolt; however, FIG. 21 shows an alternative embodiment where many small electromagnets interact directly with the corresponding pitches such as 132, 134 Preferably, the stator projections have a helical tooth form of pitch 'd'. That is to say, each projection has teeth or ridges running in a circumferential/annular direction separated in the axial direction by the distance "d". Together, the teeth form a broken helical thread, broken by the gaps between the stator projections. These teeth interact with the magnetic helix of the bolt 122 to provide a highly registered low reluctance flux path for the magnetic flux from the bolt 122. This high axial registration resists axial displacement of the bolt.

Figure 9:
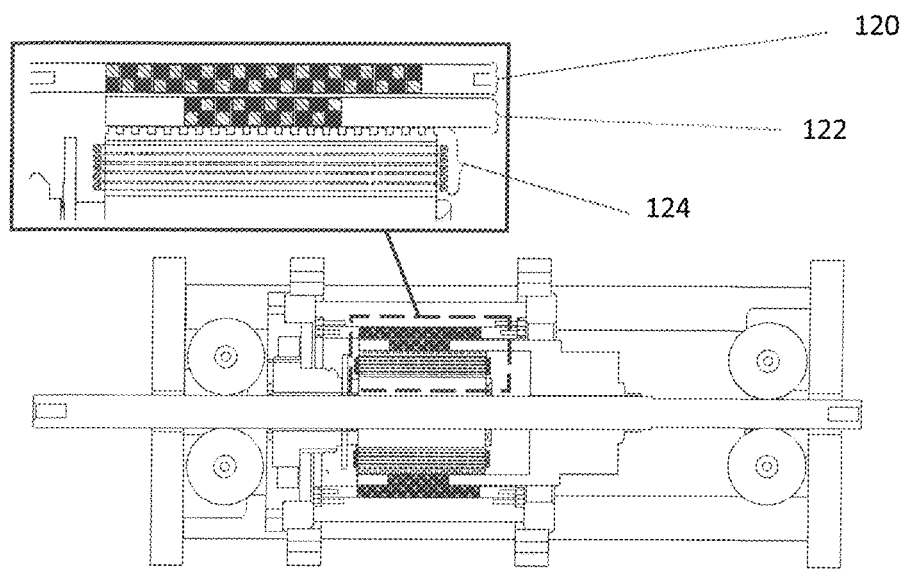
FIG. 9 is similar to FIG. 3, with certain elements shown in expanded view.

Referring to FIG. 9, a detailed view of the assembled actuator 102 in its frame 100 is shown, with the nut 120, bolt 122 and stator 124 being shown in a schematic of their magnetized operational states. This orientation shows the high degree of long axis registration desired between the magnetic poles of nut 120, bolt 122 and stator 124. This aids both on and off-power axial force capacity. In contrast to this high axial registration, the preferred embodiment may tune or minimise off-power radial registration, as shown below.

Upon application of a controlled, phased electric current, the radial electromagnets 140 become magnets of phased polarity, as described in detail below. The arrangement of electromagnetic poles created on the electromagnets 140 of the stator 124 interact with the bands of alternating polarity 136 and 138 of the bolt 122. As the bolt 122 is free to rotate relative to the stator 124, the magnetic forces created between the bolt 122 and the stator 124 cause the bolt 122 to rotate in its attempt to find a stable magnetic orientation, commonly referred to as 'alignment torque'. Through the configuration of alternating magnetic bands 136 and 138 of the bolt 122, the configuration of magnetic poles created on the electromagnetic array 140 urges the bolt 122 to a position whereby there is alignment between north poles on the bolt 122 with south poles on the stator 124 and vice-versa. (At any given phase position, the design may be such that the alignment is complete. In the preferred embodiment, alignment is incomplete, but clockwise offsets and anti-clockwise offsets are balanced.) The electrical current through the electromagnetic arrays 140 will then be altered as described below, causing further rotation as the bolt 122 seeks a stable configuration. In this manner the bolt 122 is rotated relative to both the stator 124 and the nut 120.

As the bolt 122 rotates, its path is constrained by the interaction between the twin-start helical threads 132 and 134 on its surface interacting with the twin-start helical threads 126 and 128 on the surface of the nut 120 that encases it. The attractive and repulsive magnetic forces between the helical threads of the nut 120 and the bolt 122 and the low reluctance flux path created by the tooth form on the stator constrain these components to act as if they are threaded together in a 'nut and bolt' manner. The two interleaved threads of opposite polarity 126 and 128 on the nut 120 constrain the interacting threads 132 and 134 on the bolt 122 to movement only in the manner dictated by the path of the helical threads i.e. the bolt 122 can only achieve linear axial movement through rotation along the helical paths. Linear axial movement without rotation would entail a section of helical thread on the bolt 122 moving towards a thread with similar polarity on the nut 120. This movement is hence doubly opposed by the helical thread on the bolt 122 being attracted to its facing helical thread of opposite polarity on the nut 120, and also by the helical thread on the bolt 122 being repulsed by the adjacent facing helical threads of similar polarity on the nut 120.

In this way, rotation of the bolt 122 is converted to a linear movement along the shaft 104 in line with the axis 110. This axial movement of the bolt 122 results in an axial movement of the shaft 104 in the same direction, as the bolt 122 is coupled to the shaft 104 by the collar 114 in the manner shown in FIG. 2. The proximal end 106 (or the distal end 108) is connected to a load to exert a force on the load relative to the frame 100. In this way, the actuator acts like a piston. It can apply a force in either direction along the axis 110.

Referring to FIG. 10, a detailed cross-sectional view of the subsequent stages of rotation between the bolt 122 and the stator 124 is shown. The views 10a to 10f show the magnetic arrangement across a full electrical cycle that constitutes the relative rotary motion between the bolt 122 and the stator 124. An indicative dot 142, that is fixed with respect to the bolt 122, is added to the diagram to aid comprehension.

A set of four permanent magnets 144 is shown grouped together to form a single band (i.e. sector) 136 or 138 of one of the helices 132 or 134 of the bolt 122 as shown in FIG. 7. In this figure, black can represent a north pole and grey can represent a south pole (or vice-versa). Neutral poles are not shown. The figure represents a pair of adjacent helices, with north poles of one helix illustrated radially adjacent south poles of a longitudinally adjacent helix.

Electromagnet 146 is a radial electromagnet as shown in the electromagnetic array 140 of FIG. 8. A diametric pole-pair is shown on the bolt 122, formed by two diametrically opposed sectors of permanent magnets 148a and 148b. A corresponding pole-pair 150 of the stator 124 is shown. The pole-pair 148a & 148b is magnetized with north radially outwards and south radially inwards. The pole-pair 150 is magnetized (in FIG. 10) with south radially outwards and north radially inwards.

The electrical operation of the radial electromagnets 146 is displayed using truth-tables 152, in which current flowing in each of the winding circuits A, B and C of FIG. 11 is shown in its relative state of positive '+', negative '−' or no current '0'. This shows a simple method of electrical energising, referred to as 'block commutation'; however, this pattern may be represented by sinusoids offset by 120 degrees; referred to 'sinusoidal commutation' or trapezoidal wave forms or custom waveforms, but all following the basic block commutation pattern.

Referring to FIGS. 11a and 11b, the electrical current configuration of the electromagnetic arrays 140 of the stator 124 is expanded upon. FIG. 11a shows the winding circuits A, B and separately for clarity. FIG. 11b shows a complete diagram of the circuit arrangement of the electromagnetic arrays 140 as they occur on the stator 124.

In operation, the electrical current is directed through each winding circuit A, B and C in the order shown in the truth-tables 152, FIGS. 10a to 10f. The varying states of magnetization of electromagnets 146 interact with the alternating magnetic bands 144 of the bolt 122, resulting in relative rotary motion of the bolt 122. At any stage of the electrical cycle the electric current is applied as illustrated. In response to this change in magnetic field, there is a rotation in the bolt 122 towards a position of registration between the radial electromagnets 146 and the alternating bands 144 that constitute the bolt 122. A subsequent stage of the electrical cycle applies the electric current as illustrated, and the same process of alignment occurs. In this way, a continued rotation of the bolt 122 is achieved.

By comparing the start location of dot 142 in FIG. 10a, to the final location of dot 142 in FIG. 10f, it can be seen that a full electrical cycle results in only a partial rotation of the bolt 122. By energising the radial electromagnets 146 in the manner shown in FIG. 10, a high on-power radial registration between the bolt 122 and the stator 124 is created, producing the required torque to controllably rotate the cylinder. There is a high electromechanical advantage. Every three arms of the stator (spanning 90 degrees of arc) are energized in three phases, in two magnetic orientations, giving six phase combinations. A full cycle of six electrical phase combinations causes rotation of the rotor (bolt 122) to rotate 37.5 degrees. Forty eight phase combinations are required to give a full rotation of the rotor. Each step is 360/48=7.5 degrees. More generally, each step angle is given by 360/(no. of stator pole pairs*no. of rotor pole pairs). If the rotor had only a single pole pair, it would rotate 360 degrees in 6 steps, i.e. each step would be 360/6=60 degrees.

For the given cross sectional arrangement there are, in the preferred embodiment, 48 sequence steps required to complete a full 360 degree mechanical rotation of the rotor.

Figure 12A:
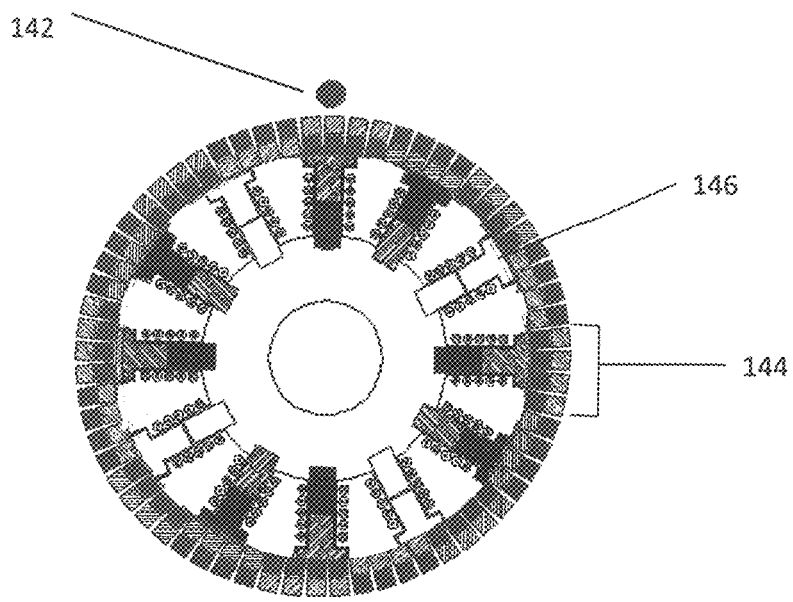
FIG. 12 shows the preferred rotor and stator components in cross section with different phase states
Figure 12B:
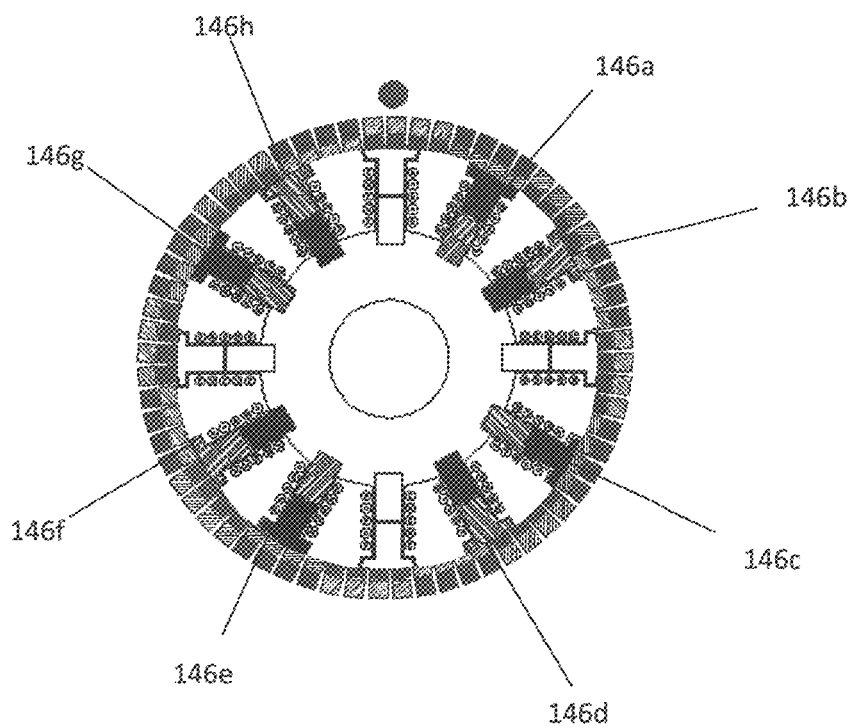

In the preferred embodiment, there is a mismatch in the number of alternating band pole-pairs 148 to radial electromagnet pole-pairs 150. The bolt 122 has more (preferably eight) alternating band pole-pairs 148, and the stator 124 has fewer (preferably six) radial electromagnet pole-pairs 150. This is more clearly illustrated in FIGS. 12a and 12b, which shows the stator in first and second phases of magnetization, with the rotor in the same position (indicated by the dot 142) to illustrate the change in magnetic forces as the phase changes, before the rotor rotates.

The stator is shown in the first (FIG. 12a) and second (FIG. 12b) phases of magnetization. The varying states of magnetization of electromagnets 146a to 146h interact with the alternating magnetic bands 144 of the bolt 122, resulting in relative rotary motion of the bolt 122.

Each single electromagnet 146 faces a combination of two separate magnetic bands 144, partially facing each of the two bands. As each magnetic band 144 is formed from four (of 64) similarly orientated permanent magnets (or is an arcuate magnet spanning 22.5 degrees of arc), a single electromagnet 146 (spanning 30 degrees of arc) will never experience full registration with a single magnetic band 144. Instead the electromagnet 146 will either be facing: three north poles and one south pole, two north poles and two south poles, or three south poles and one north pole (or their equivalents in terms of degrees of arc).

The system begins in a state of stability (FIG. 10a and FIG. 12a), with total repulsive magnetic force as experienced by the entire system minimized, and total attractive forces maximised. A rotation only occurs after a change in phase of the electromagnets 146 of the stator 124. The phase change causes a new state (FIG. 12b), which is orientated so that band/sector of permanent magnets is incrementally offset from an electromagnet of opposite polarity. This maximizes the tangential attractive and repulsive magnetic forces, and such forces are all in the same rotational direction (forcing the rotor clockwise). Thus, electromagnet 146*a* is fully registered; 146*b* is one permanent magnet (about 5.6 degrees) displaced from full registration; 146*c* is fully registered; 146*d* is one magnet displaced from full registration; 146*e* is fully registered; 146*f* is one magnet displaced from full registration; 146*g* is fully registered; 146*h* is one magnet displaced from full registration. Each magnetized arm of the stator is applying force in the same direction upon the facing magnetic band 144. This cumulative force acts to turn the stator in the preferred direction, which in this embodiment is clockwise.

The numerical mismatch ensures that at least some of the electromagnets 146 are always partially facing two magnetic bands 144, and are never fully registering with a single magnetic band 144 and the bolt 122 will always have a preferred direction of motion in which it can move. This preferred direction of rotation occurs in part because the electromagnet 146 is always facing at least one element (or a partial segment) of a magnetic band 144 that is of the same polarity as itself and is repulsive.

After each further change in phase, the mismatch configuration of the magnets results in the bolt 122 rotating in the desired direction. The magnetic mismatch configuration always creates an unambiguous direction of preferred rotation for the bolt 122 to move to a stable position.

The configuration of the magnetic mismatch, formed by the larger number of alternating magnetic bands 144 facing the fewer number of radial electromagnets 146, combined with the three phase (six phase/polarity combination) electrical setup, ensures that the phase change experienced by each of the electromagnets 146 around the entire stator 124 creates the same preferred direction of movement at every point around the bolt 122.

It is possible to have a system with an equal number of radial electromagnets and alternating band poles. For example, a system could be envisaged with a complete registration of twelve radial electromagnets to twelve alternating band poles, while giving good torque and unambiguous direction.

More generally, preferred configurations comply with the following equation:

$$K_0 = \frac{2N_S(1+3q)}{3N_M} \quad \text{(Equation 1)}$$

where $K_0 \neq S$ $K_0$=Integer Slot Offset (offset between permanent magnet poles and stator slots)
$N_S$=Number of slots between the radial electromagnets
$N_M$=Number of magnets on the rotor (i.e. fractions of a full circle)
q=any positive integer
S=Coil span (=the number of stator projections, i.e. radial electromagnets, that a coil winding spans)

The preferred configurations have the following constraints:

(i) there is an even number of magnets ($N_M$) on the rotor, orientated in such a way that there is an equal number of north and south poles facing the electromagnets.

(ii) for S=1, as depicted in FIGS. 10 and 11, the defining variable is the number of slots ($N_S$) between the radial electromagnets, where $N_S$ is required to be a factor of six i.e. $N_S$=n/6 where n is a positive integer.

With reference to (i), FIG. 10 has each alternating band pole 144, formed from four identically orientated bar magnets, representing one value of $N_M$. Hence in FIG. 10 $N_M$=16.

With reference to (ii), FIGS. 10 and 11 have $N_S$=12, but it is possible to use any valid value of $N_S$ as defined above.

Figure 13:
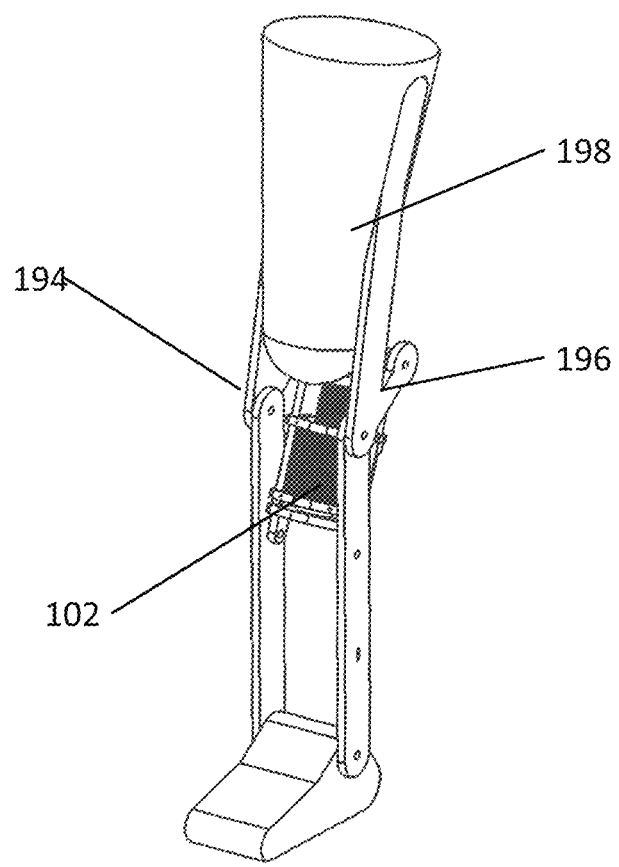
FIG. 13 illustrates an embodiment of the actuator within a prosthetic leg.

Referring to FIG. 13, an embodiment of the actuator within a prosthetic leg is shown. The actuator 102 is seen in place of the prosthetic knee joint 194, with the intended use of flexing and extending in the manner of a human knee joint. The linear movement produced by the actuator is converted into the desired rotary movement through the crank arm 196. The amputee's vestigial limb is secured into the prosthesis by a socket 198.

The preferred embodiments provide certain characteristics and advantages. High off-power axial registration between the nut 120 and the bolt 122 ensures that the actuator can continue to support a load when no power is applied, dependent upon designed cogging torque. The feature of high off-power axial registration presents a fail-safe, as the magnets of the nut 120 will resist linear force applied against the bolt 122. For example, in a prosthetic leg embodiment, this feature ensures that the leg does not collapse under the applied weight of the user when the actuator is in the off-power state. The high on-power axial registration and high on-power radial registration delivers high torque and therefore high axial force under application of power.

The combination of high off-power magnetic axial registration and low off-power magnetic radial registration, as well as the low friction in the magnetic helix, gives the ability for the bolt 122 to rotate in the off-power state, as the permanent magnets of the twin helices on both the nut 120 and the bolt 122 continue to interact in a thread like manner independent of power.

The high off-power axial registration created through the magnetic pattern shown in FIGS. 6 and 7, ensures that a large force is required in the linear axial direction to cause movement solely in this direction, as the magnetic interaction between the helices of both the nut 120 and the bolt 122 provide strong resistance to this movement as does the matched magnetic flux path provided by the tooth forms upon the circumference of the stator FIG. 8. Similarly, the low off-power radial registration created through the magnetic pattern shown in FIGS. 6 and 7 allows free rotary movement by the bolt 122. This combination of highly restricted movement along the linear axial direction, and free movement in the rotary direction, combine to allow the actuator to rotate under application of linear axial force when in the off-power state. This ability for the actuator to linearly translate motion freely is advantageous in applications that aim to utilise body movement to conserve battery power, as well as simulate human-like movement.

The high off-power axial registration and the low off-power radial registration, are related by tuning the cogging torque produced by the transverse cross sectional profile of the ferromagnetic material of the stator. It is possible to envisage other embodiments based on the same design in which the design is exploited for different advantages e.g. to increase the ability for the bolt 122 to rotate in the off-power state under application of an external linear force, by increasing the helical pitch 'd'. This decreases the mechanical advantage and leaves the actuator less able to support a load in the off-power state. Increased pitch delivers greater axial movement for a given rotation but delivers less axial force under application of power. Correspondingly, if the magnets can be made smaller and the pitch decreased, mechanical advantage can be increased but more turns of the bolt 122 are required to give the same axial displacement.

Referring to FIG. 14, a perspective view of an alternative embodiment of the actuator is shown. This actuator has end caps 154, an outer cylinder 156 and a shaft 158. It is illustrated without the presence of a non-ferromagnetic tube cover that would be held between the end-caps. This cover and the end caps are fixed with respect to the frame 100, with the outer cylinder 156 rotating within it.

The outer cylinder 156 (which in this embodiment can be referred to as the "nut") is similar in design to the bolt 120 of the previous actuator embodiment 102. It has the same array of permanent magnets (as described below) but is longer and has more turns.

The shaft 158 moves in a linear axial direction with respect to the nut 156, passing through end-caps 154. The shaft 158 incorporates access for wiring 160, which supplies the electrical current to the internal workings and phase windings.

FIG. 15 is an exploded view of the elements that form the actuator of FIG. 14. A stator assembly 162 is shown. It comprises an array guide of permanent magnets 168 and a stator 170. It is housed inside the nut 156. Each end-cap 154 can be seen to incorporate an annular ball-bearing race 164 to allow the nut 156 to rotate independently of both the stator assembly 162 and the shaft 158. The end-caps 154 incorporate bearings 166 to allow the shaft 158 to traverse linearly with respect to the nut 156. The shaft 158 is fixed to the stator assembly 162 and slides with the stator and the shaft in an axial direction as the nut rotates.

Figure 16:
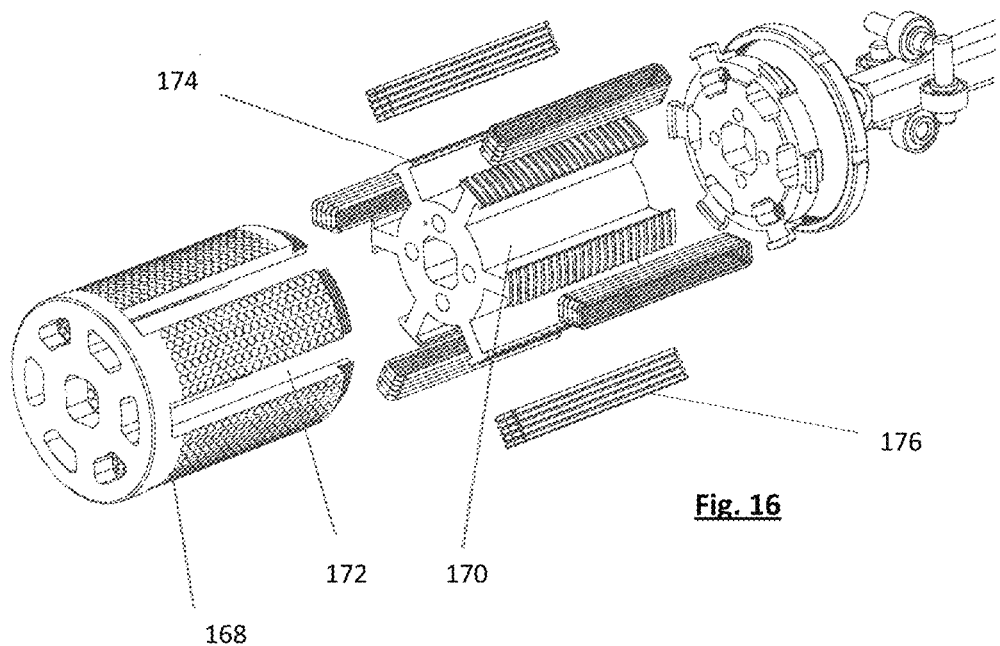
FIG. 16 shows certain elements of FIG. 15 in larger scale.

Referring to FIG. 16, an increased scale view of the stator assembly 162 of FIG. 15 is shown. The array guide of permanent magnets 168 is different from nut 120 of FIG. 6 in that its position in the system is now embedded with the stator 170 as part of the stator assembly 162. The array guide of permanent magnets 168 has slots 172 to allow it to be inserted around the centre of the stator 170, with laminated stator projections 174 protruding radially outward in the slots. Electrically conductive wire windings 176 are wound around each of the stator projections 174 to allow for the creation of electromagnets when a current is applied.

In operation, the wire windings 176 have electrical current applied to them. Magnetic interaction between the stator projections 174 and the magnetic elements of the nut 156 cause the nut 156 to rotate with respect to the stator assembly 162. As motion of nut 156 and its end caps is linearly fixed with respect to the stator assembly 162 the magnetic interaction between the rotating nut 156 and the fixed array guide of permanent magnets 168 causes a linear axial movement of the stator assembly 162. This in turn causes the shaft 158 to move along its axis. In this embodiment a separate mounting frame such as 100 in the test rig FIG. 1 is not necessary and the actuator may be mounted to operate by fixing relatively moving sections to shaft 158 and either end cap 154.

The detailed description of the processes that cause this movement behaviour have been described above in the operational descriptions of following the description of FIG. 9, and in the operational description following the description of FIGS. 11a and 11b. These descriptions, although in reference to a previous embodiment, are equally applicable to the embodiment seen in FIGS. 14, 15 and 16, as the theoretical workings of the different embodiments are equivalent.

Figure 17:
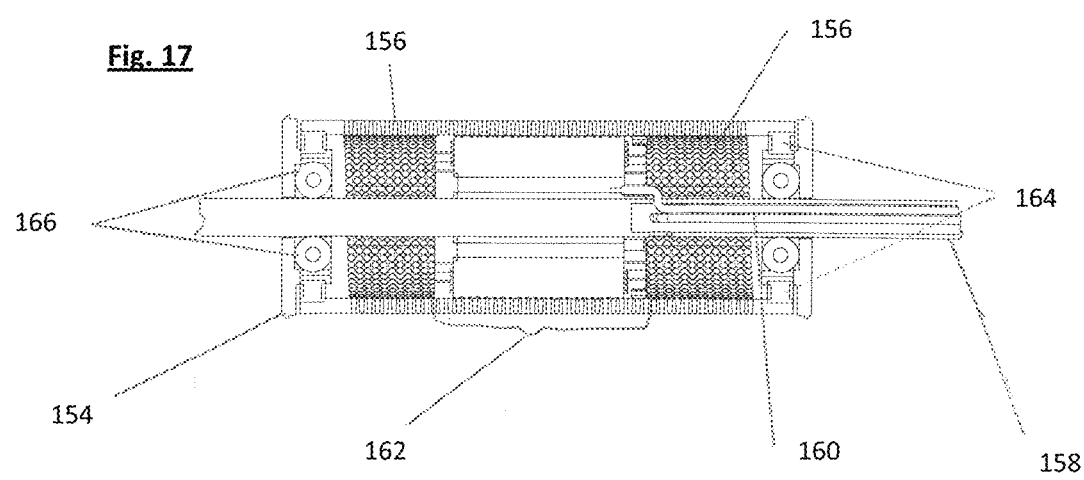
FIG. 17 illustrates a cross section of the components of FIG. 14.

Referring to FIG. 17, a cross-sectional view of the components of FIG. 14 is shown. The wheel bearings 166, the annular ball-bearing race 164, the end-caps 154 and the wiring 160 are shown. The elements of FIG. 14 are shown within the nut 156, which is axially fixed with respect to the stator assembly 162 and the shaft 158, and is fixed also with respect to the rotation of the nut 156. Dimensionally, the length of the nut 156 can be seen to be larger than the length of the stator assembly 162. This allows the required stroke movement of the stator assembly 162 longitudinally within the nut 156. A longer nut will permit a greater stroke.

Referring to FIG. 18, a view of the magnetic arrangement of the array guide of permanents magnets 168 as embedded within the stator projections 174 is shown. The array guide 168 is formed by permanent magnets facing radially outward and inward. These magnets are arranged in a twin-start helical array, with each of two separate threads 180 and 182 having a different magnetic pole, one thread being north and the other being south. This creates an alternating pole arrangement between the two threads of the nut (which, in FIG. 6 are labelled 126 and 128), with a helical pitch 'd'.

Referring to FIG. 19, a view of the magnetic arrangement of the nut 156 is shown. It comprises an arrangement of magnets facing radially outward and inward, with helical pitch 'd'. The magnetic arrangement of nut 156 has three types of magnetization: north, south or neutral. Neutral is achieved using either absent or partial length magnets 184. The helical twin-start arrangement of magnets contains two distinct threads 186 and 188, with each thread having only two types of magnetization, where one of those types must be neutral. For both threads a pattern is achieved with regular absent magnets 184. The pattern created forms alternating magnetic bands 190 and 192 parallel to the long axis of the nut 156. This design is equivalent to the design of the bolt 122 in FIG. 7.

It is possible to envisage alternate embodiments of the design described above.

Referring to FIG. 20, an alternative embodiment of the design is shown. A permanent magnet arrangement 200 forming a rotor 202 is shown, housed within an electromagnetic arrangement 204 forming a stator 206. There is no second cylindrical element. Boundary discontinuities 210 and 211 in the permanent magnet arrangement 200 are shown.

FIG. 20a is an enlarged image 208 of a portion of the permanent magnet arrangement 200 of FIG. 20 and shows that when the rotor is internal to the stator, there are gaps between the permanent magnets on the external surface of the rotor.

It is preferred that the stator is internal to the rotor. Such an arrangement is more compact. Additionally, the permanent magnet faces of the rotor are more closely packed on the internal surface than on the external surface and this aids smooth running.

Referring to FIG. 21, a detailed view of a single helical turn of the stator 206 is shown. Two complementary helical armatures 212 and 214, made of suitably magnetically susceptible material are shown. The radial projection electromagnets 216 are attached to the helical armatures 212 and 214 as shown. FIG. 21 shows absolute registration of electromagnet to permanent magnet pitch, but the arrangement is complex, less economically practical and not the most preferred embodiment.

Figure 22:
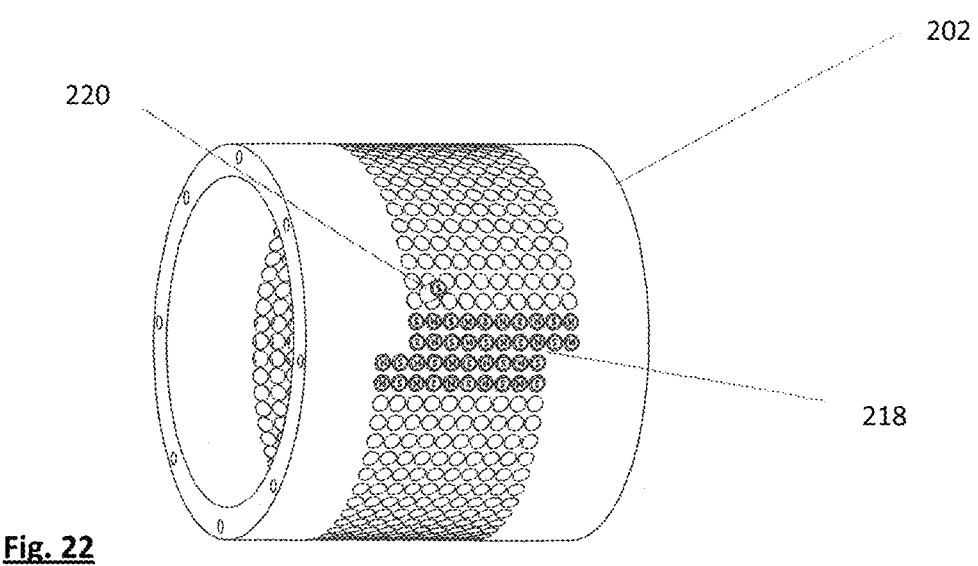

Referring to FIG. 22, a detailed view of the rotor 202 is shown. In this embodiment, the rotor is fixed to the shaft and delivers the linear motion. The rotor is made from a suitably magnetically low permeability material, such as aluminium alloy, and drilled with multiple holes in twin-start helical pattern, similar to the nut 120 of FIG. 4. The permanent magnets 220 are placed within these holes. The magnets 220 are arranged in such a manner as to have a regular alternating segmented radial magnetic pattern, and an alternating linear magnetic pattern along the long axis of the cylinder. Each of the two twin helices has the same pattern, however in opposite magnetic polarities to the other helical threads axially adjacent to it. Each thread has two different sections of polarity for each full revolution of its path around the cylinder. The first section is formed from an array of adjacent permanent magnets each of identical polarity. This section ends half way through a single revolution around the cylinder. The second section is identical to the first, but of the opposite polarity. As such there are two discontinuities in polarity per revolution.

In operation, the underlying magnetic interaction between the permanent magnet array 200 of the rotor 202 and the electromagnets 204 of the stator 206 is identical to that described in the previous embodiment, relying on uniquely defined phase changes in the electromagnets 204 to interact with the magnetic arrangement 200 of the rotor 202 such that an unambiguous preferred direction of rotation is experienced across the entire face of the rotor 202. Under the influence of the unambiguous direction of preferential movement, the rotor 202 would rotate and therefore move linearly with respect to the fixed stator 206. In this embodiment, the rotor 202 is seen to have only two sectors of permanent magnet arrays 200 to form the alternating bands of magnetic polarity per single revolution of the cylinder. These two sectors are separated by discontinuities 210 and 212. The choice of only two alternating magnetic sectors here, as opposed to the 16 alternating magnetic bands 144 as shown in FIG. 10, lends the operation of the actuator different characteristics. This setup has a lower torque in rotation when compared with the previous embodiments of FIGS. 1 to 19. This lower torque arises due to the lower number of discontinuities found around the entirety of the rotor 202, as it is only at each discontinuity that a force capable of causing rotation is experienced by the magnets 220 on the rotor 202 as caused by the change in phase of the electromagnets 216 of the stator 206. Permitted rotor and stator pole combinations utilising a three phase winding electrical energisation strategy are defined by equation 1 above. In addition to minimising air gap length between stator and rotor, optimising efficient torque production may be achieved by increasing stator and rotor diameter and the pole pairs of each, resulting in the approximation that for unit length of actuator Torque=k diameter^2 When designing actuators with different technical agendas, it may be desirable for some instances to use a number of sectors not equal to the optimum number as defined in this equation.

The design shown in FIGS. 20, 21 and 22 has a larger volume with a less efficient use of space when compared with the preferred embodiments described in the FIGS. 1 to 19. Additionally, the permanent magnet 200 faces are seen to be less closely packed on the external surface than on their internal surface, and this may thereby detract from the smooth running of the system due to the larger gaps 208 between the permanent magnets 200 as shown.

Referring to FIGS. 23 to 26, an alternate embodiment of the actuator is shown. At the distal end of the actuator rod there is a fixing 222 to attach to the load, and at the proximal end there is a trunion fixing point 224. These are useful and flexible fixing arrangements.

In this embodiment the actuating rod 226 does not project out from the proximal end when in the retracted state. This is achieved by having the fixed guide rod 228 telescope within the actuating rod 226. To facilitate this, one set of guide wheels is fixed with respect to the cylinder 230 and one set of guide wheels 232 is fixed with respect to the actuating rod. This modification, independent of other features of this embodiment, advantageously reduces the working volume for constrained applications and avoids possible hazards from a double-ended actuating rod.

Further to this, the rotor 234 is axially fixed with respect to the stator 236 and the low reluctance tooth form upon the stator 236 has been dispensed with. The magnet fill pattern of the rotor 234 (see FIG. 7 above) remains the same. FIGS. 23 to 26 show that the stator 236 now moves with the actuating rod 226 in an equivalent manner to FIG. 17 above.

Additionally, FIGS. 23 to 26 also show that the helical track 238 is fixed, it is the rotor 234 that rotates about the long axis of the actuator and moves with the actuating rod 226. Stated alternatively, the outer cylinder 240 is fixed, the stator 236 slides, and between the outer cylinder 240 and the stator 236 these is a rotor 234 that slides with the stator 236 but rotates relative to the outer cylinder 240. Experiments demonstrate that it is possible to support satisfactory axial loads using only magnetic forces between the rotor 234 and helical track 238. In addition, it is preferable to maintain maximum overlap of rotor 234 and stator 236 to generate maximum torque between these components.

Referring to FIG. 27, an exploded view of the actuator embodiment of FIGS. 23 to 26 is shown, with the following components:
- 242 Spherical bearing load attachment
- 226 Actuating rod
- 244 Signal cable (for Hall Effect Sensors 266 and Optical encoder 264)
- 246 Cables to stator windings (×3 (r))
- 248 Printed circuit board with Hall Sensor (×3) and optical encoder sensor 264
- 250 Optical grating radial array of 256 black bars upon a reflective backing
- 252 Ring secured to rotor 234 with radial array of permanent magnets with polarity pattern for Hall Sensors 266
- 254 Distal slim section angle contact bearing
- 236 Stator formed from a stack of electrical steel laminations
- 234 Rotor (magnet fill pattern equivalent to patent filing FIG. 7)
- 256 Proximal slim section angle contact bearing
- 258 Internally threaded angle bearing support facilitating adjustable preload of angle contact bearings
- 260 Housing for guide wheels 262
- 262 Guide wheels
- 264 Two-channel optical encoder sensor
- 266 Hall effect sensors (×3)
- 268 Distal support for angle contact bearing (between rotator and actuating rod)
- 270 Stator windings (×3)

Many aspects of the enclosed invention present significant advantages over the prior art. The dynamic properties of the actuator result from interacting magnetic and electromagnetic fields without the need for a separate mechanical transmission and this leads to the following benefits:

The actuator does not have the added mass and bulk of a mechanical transmission stage. This promotes its use as an actuator for a portable device, whilst also enabling the actuator to fit within a cosmetic envelope such as the form of an absent body part for a prosthetic limb replacement. Similarly, it facilitates the actuator to be used in designs that need to be worn closely to the user's body, such as for a powered orthosis or exoskeleton.

The actuator does not require high tolerance mechanical parts within a mechanical transmission stage. This feature promotes cost-effective manufacture, and also facilitates easier and less skilled assembly, hence also requiring less skilled personnel in maintenance and repair. The transmission does not require lubricant for close fitting mechanical parts in order to work efficiently. This enables the actuator to be worn close to the user's body without the potential hazard of lubricant contamination, and also enables reliable use without the need for regular maintenance and re-lubrication. In terms of functionality, this feature promotes the use of the actuator within portable devices where gravitational effects are not constantly from the same direction. The absence of lubrication enables the actuator to be used in dirty, dusty or sandy environments that present seizing hazards to lubricated mechanical transmissions, and also enables the actuator to be used in low pressure environments where common lubricants evaporate and lose their effectiveness. The absence of lubricant is also beneficial to applications intolerant to material contamination such as clean room operations and automated food preparation.

The transmission generates less noise in operation than a comparable mechanical transmission. This enables the actuator to be used within devices that covertly aim to replace the function of an absent limb where undue noise would betray the limb as artificial, hence enabling the actuator to be used to support the action of inadequately functioning intact joints without drawing attention to the wearer through undue operational noise. Similarly, it enables the actuator to be used in multidegree or multi-axis systems where cumulative noise would be distracting for operation.

The actuator has a sliding section that when un-powered is can be designed to be free running. This promotes the use of the actuator for an active prosthetic knee, where the body generated 'swing' of the wearer's natural thigh and hip can be used to swing the knee joint into an extended position during walking without the need for external power so conserving portable power supplies. Free-running and absence of mechanical connection can also increase the longevity of the actuator as shock loadings are not transmitted to mechanical parts within the actuator. This feature also promotes the use of the actuator for service robotics where compliance to human interaction is necessary for safety.

This free-running also presents the opportunity to use the actuator as a as a sensor or generator as in reverse mode imparted high forces to the output shaft of the actuator will cause rapid rotation of the rotor inducing electrical currents to be formed into the phase windings.

The actuator has a sliding section that can be electronically positioned extremely accurately and repeatedly. This enables the actuator to be used for applications that require extremely accurate and repeatable positioning, without the need to constantly adjust mechanical parts as they wear.

The sliding section of the actuator can be controlled with intermediate force engagement under electrical control. As a result, the actuator can be used as a damper by adjusting the electromagnetic engagement between the sliding and stationary elements and used to actuate a knee prosthesis to better simulate natural walking gait. With an appropriate control system the actuator may also be used as a mechanical 'active-filter' orthosis, such as at the elbow for a person suffering with tremors, where their unwanted limb movement might be damped and their desired movements assisted using suitable control strategies and sensors. The actuator may be used in part of a remote control or teleoperation system, with this feature used to accurately reflect and mimic the force and position exerted upon the remote or virtual object.

What is claimed is:

1. An actuator comprising:
    a stator comprising electromagnetic sectors for generating phased electromagnetic fields around the stator; and
    first and second cylindrical elements, the stator and the first and second cylindrical elements being arranged concentrically around a central axis; and
        wherein the first cylindrical element comprises permanent magnetic elements magnetized radially and arranged in at least one helix;
        the second cylindrical element comprises permanent magnetic elements magnetized radially and arranged as at least one discontinuous helix;
    whereby phased magnetization of the stator causes the second cylindrical element to rotate around the axis along a helical path relative to the first cylindrical element, thereby causing the first and second cylindrical elements to exert opposing longitudinal forces along the axis.

2. An actuator according to claim 1 wherein the second cylindrical element is mounted around the stator and the first cylindrical element is mounted around the second cylindrical element.

3. An actuator according to claim 1, further comprising a frame, wherein the stator and first cylindrical element are fixed relative to the frame and the second cylindrical element is free to rotate relative to the frame.

4. An actuator according to claim 3, further comprising an axle mounted along the axis, wherein the second cylindrical element is free to rotate relative to the axis but axial movement between the second cylindrical element and the axle is constrained, whereby the axle moves longitudinally relative to the frame and exerts a longitudinal force relative to the frame.

5. An actuator according to claim 1 wherein the first cylindrical element comprises permanent magnetic elements magnetized radially and arranged in first and second interwound helices, the magnetic elements of the first helix being of opposite polarity to the magnetic elements of the second helix.

6. An actuator according to claim 1 wherein the second cylindrical element comprises sectors of relatively high and low magnetization, alternating along a helical path around the cylindrical element.

7. An actuator according to claim 1 wherein the second cylindrical element comprises sectors of relatively high and low magnetization, alternating in an axial direction along the cylindrical element.

8. An actuator according to claim 1 wherein the second cylindrical element comprises a first helix of alternating sectors of relatively high and low magnetization and a second helix, interwound with the first helix, of alternating sectors of relatively high and low magnetization, the sectors of relatively high magnetization of the first helix and the sectors of relatively high magnetization of the second helix being of opposite polarity and being at an angular offset to each other.

9. An actuator according to claim 1 wherein the permanent magnetic elements of one or both of the first and second cylindrical elements being formed as magnetized plugs mounted in radial holes formed in a cylinder of non-ferromagnetic material.

10. An actuator according to claim 1 wherein the stator having N sectors and the second cylindrical element comprising permanent magnetic elements arranged as at least one helix with at least N+1 sectors.

11. An actuator according to claim 1 wherein the stator having N sectors and the second cylindrical element comprising permanent magnetic elements arranged as at least one helix with at least 4N/3 sectors.

12. An actuator according to claim 1 wherein the second cylindrical element has an open end and a closed end, the open end mounted over the stator with the stator free to move in and out of the open end, and the closed end having a bearing by which it is mounted on the axle.

13. An actuator according to claim 1 wherein the stator has protruding teeth that correspond to the helically arranged permanent magnetic elements of the at least one cylindrical element.

14. A method of manufacture of an actuator comprising:
   forming a stator comprising electromagnetic sectors for generating phased electromagnetic fields around the stator; and
   forming first and second cylindrical elements, wherein the first cylindrical element comprises permanent magnetic elements magnetized radially and arranged in at least one helix, and the second cylindrical element comprises permanent magnetic elements magnetized radially and arranged as at least one discontinuous helix; and
   mounting the stator and the first and second cylindrical elements concentrically around a central axis, such that the second cylindrical element is rotatable around the axis along a helical path relative to the first cylindrical element.

15. A method of providing longitudinal force comprising:
   providing a stator comprising electromagnetic sectors for generating phased electromagnetic fields around the stator;
   providing first and second cylindrical elements, the stator and the first and second cylindrical elements being arranged concentrically around a central axis, the first cylindrical element comprising permanent magnetic elements magnetized radially and arranged in at least one helix, the second cylindrical element comprising permanent magnetic elements magnetized radially and arranged as at least one discontinuous helix; and
   magnetizing the sectors of the stator in angular phases to cause the second cylindrical element to rotate around the axis along a helical path relative to the first cylindrical element, and such that the first and second cylindrical elements exert opposing longitudinal forces along the axis.

16. A sensor or generator comprising:
a stator comprising electromagnetic sectors
first and second cylindrical elements, the stator and the first and second cylindrical elements being arranged concentrically around a central axis;
the first cylindrical element comprising permanent magnetic elements magnetized radially and arranged in at least one helix, the second cylindrical element comprising permanent magnetic elements magnetized radially and arranged as at least one discontinuous helix and magnetically constrained to rotate along a helical path relative to the first cylindrical element, whereby longitudinal forces along the axis causes rotation of the second cylindrical element around the axis along the helical path relative to the first cylindrical element, thereby inducing electrical current in the electromagnetic sectors.

\* \* \* \* \*